US007777826B2

(12) United States Patent
Lai

(10) Patent No.: US 7,777,826 B2
(45) Date of Patent: Aug. 17, 2010

(54) ACTIVE MATRIX SUBSTRATE AND REPAIR METHOD OF PIXEL UNIT

(75) Inventor: Han-Chung Lai, Taoyuan Hsien (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 12/562,139

(22) Filed: Sep. 18, 2009

(65) Prior Publication Data

US 2010/0007812 A1 Jan. 14, 2010

Related U.S. Application Data

(62) Division of application No. 11/162,653, filed on Sep. 19, 2005, now Pat. No. 7,612,840.

(30) Foreign Application Priority Data

Jun. 23, 2005 (TW) ............................ 94120905 A

(51) Int. Cl.
*G02F 1/1333* (2006.01)
*G02F 1/1343* (2006.01)
*G02F 1/136* (2006.01)

(52) U.S. Cl. ............................ 349/54; 349/38; 349/48

(58) Field of Classification Search .................. 349/38, 349/54, 48
See application file for complete search history.

(56) References Cited

U.S. PATENT DOCUMENTS 5,102,361 A * 4/1992 Katayama et al. .............. 445/4
5,151,807 A * 9/1992 Katayama et al. ............. 349/55
5,260,818 A * 11/1993 Wu ............................ 349/55
5,367,392 A * 11/1994 Janai .......................... 349/55

* cited by examiner

*Primary Examiner*—David Nelms
*Assistant Examiner*—W. Patty Chen
(74) *Attorney, Agent, or Firm*—Jianq Chyun IP Office

(57) ABSTRACT

An active matrix substrate including a substrate, a plurality of scan lines, a plurality of data lines and a plurality of pixel units is provide. All of the scan lines, the data lines, the pixel units are disposed on the substrate. Each of the pixel units is electrically connected with the corresponding scan line and data line. In addition, at least a part of the pixel units further includes a plurality of active devices and a pixel electrode. The active devices are respectively electrically connected with the corresponding scan lines and data lines and the pixel unit is electrically connected with one of the active devices. In summary, each of the pixel units of the active matrix substrate provided by the invention includes more than one active device. When an active device is damaged under normal operation, another active device may be employed for repairing the pixel unit.

7 Claims, 26 Drawing Sheets

ACTIVE MATRIX SUBSTRATE AND REPAIR METHOD OF PIXEL UNIT

CROSS-REFERENCE TO RELATED APPLICATION

This application is a divisional application of and claims the priority benefit of patent application Ser. No. 11/162,653, filed on Sep. 19, 2005, which claims the priority benefit of Taiwan application serial no. 94120905, filed on Jun. 23, 2005. The entirety of each of the above-mentioned patent applications is hereby incorporated by reference herein and made a part of this specification.

BACKGROUND OF THE INVENTION

1. Field of the Invention

The present invention relates to an active matrix substrate and a repair method thereof, and particularly to an active matrix substrate having redundant active devices and a repair method thereof.

2. Description of Related Art

The display technology is continuously fast developing since the first black-and-white TV employing a cathode ray tube (CRT). However, the CRT display has the disadvantages of bulkiness, heaviness, high radiation, and relatively poor pixel quality. Therefore, other advanced flat display technologies have been gradually developed, among which liquid crystal displays (LCDs), having the advantages of better space efficiency, lower power consumption, lower radiation and better portability, is the most mature and popular technology. LCDs are widely used in the fields of cell phones, digital cameras, digital camcorders, personal digital assistants, notebook PCs and liquid crystal TVs.

Although the LCD technology tends to be mature, it is inevitable to produce some defects during the LCD panel manufacturing process, which may to some degree cause visual discomfort because of the LCD panel displaying images. And the production cost will be substantially raised if such an LCD panel is directly discarded. Generally, it is very difficult to achieve a zero defect ratio by merely improving manufacturing processing technologies; therefore the defect repairing technology of LCD panels is becoming more and more important. In conventional technologies, laser cutting or laser welding is often adopted for LCD panel defect repair. Taking a TFT-LCD as an example, a process of laser cutting or laser welding is usually processed after a TFT array has been manufactured. Unfortunately, because of some drawbacks of the conventional pixel structure design, not all defects may be rapidly repaired, and some of them even cannot be repaired.

FIG. 1A is a top view of a conventional TFT array substrate; FIGS. 1B and 1C are cross-sectional views of FIG. 1A respectively along with line a-b and line c-d. Referring to FIGS. 1A to 1C together, a conventional TFT array substrate 100 includes a substrate 110, a plurality of scan lines 120, a plurality of data lines 130 and a plurality of pixel units 140, wherein the scan lines 120, the data lines 130 and the pixel units 140 are all disposed on the substrate 110.

The pixel units 140 are electrically connected with the corresponding scan lines 120 and data lines 130. Each of the pixel units 140 includes a TFT 142 and a pixel electrode 144, for example, an indium tin oxide (ITO) electrode. In the prior art, the TFT 142 includes a gate electrode 142*a*, an amorphous silicon channel layer 142*b*, a source electrode 142*c* and a drain electrode 142*d*. The gate electrode 142*a* is connected with the scan line 120. The gate electrode 142*a* and the scan line 120 belongs to a first metal layer. The source electrode 142*c* is connected with the data line 130, and the data line 130. The source electrode 142*c* and the drain electrode 142*d* belongs to a second metal layer. The pixel electrode 144 is electrically connected with the drain electrode 142*d*.

However, a defective TFT 142 may hinder the normal operation of the pixel unit 140. Such a defect corresponds to a bright dot defect on the LCD panel after the TFT substrate 100 and a color filter substrate are assembled and the liquid crystal is filled. To avoid such bright dot defects on the LCD panel, a laser repairing process is needed for repairing such bright dot defects to a dark dot. Referring to FIGS. 1A to 1C, a conventional repairing method is to weld the pixel electrode 144 with an adjacent scan line 120 via laser welding process, by which the repaired pixel unit 140 will become a dark dot.

FIG. 2A is a top view of another conventional TFT array substrate; FIGS. 2B and 2C are cross-sectional views of FIG. 2A respectively along with line a-b and line c-d. Referring to FIGS. 2A to 2C together, a conventional TFT substrate 200 includes a substrate 110, a plurality of scan lines 120, a plurality of data lines 130, a plurality of pixel units 140, a plurality of repair lines 210, a plurality of repair structures 220, wherein the scan lines 120, data lines 130, pixel units 140, repair lines 210 and repair structures 220 are disposed on the substrate 110.

The substrate 110, the scan lines 120, the data lines 130 and the pixel units 140 are the same as the foregoing disposed on the TFT array substrate 100. One terminal of the repair structure 220 is connected with the data line 120, and the other terminal of the repair structure 220 is connected with the drain electrode 142*d*. The repair structure 220 belongs to the second metal layer. Each repair line 210 is disposed under one of the repair structures 220 and the repair lines 210 belong to the first metal layer. A gate insulating layer 170 is disposed between the repair line 210 and the repair structure 220.

Referring to FIGS. 2A to 2C again, a defective TFT 142 may hinder the normal operation of the pixel unit 140. Such a defect corresponds to a bright dot defect on the LCD panel after the TFT substrate 100 and a color filter substrate are assembled and the liquid crystal is filled. To avoid such bright dot defects on the LCD panel, a laser cutting process is usually employed to cut the connection 150 between the gate electrode 142*a* and the scan line 120, and a laser welding process is then performed to weld the repair line 210 and the two terminals of the repairing structure 220. However, the repaired pixel unit is a bright dot defect or a dark dot defect. When a compensation film is attached to a large LCD panel to enhance the viewing angle, such repaired pixel units may again cause bright dot defects at some certain viewing angles due to light leakage.

SUMMARY OF THE INVENTION

In view of the above, the present invention is directed to provide an active matrix substrate having a redundant active device to efficiently prevent bright dot defects on the LCD panels.

In view of the above, the invention is directed to provide a repair method of a pixel unit, by which a repaired pixel unit can normally operate; therefore, the yield rate of the LCD panel may be improved.

The invention provides an active matrix substrate including a substrate, a plurality of scan lines disposed on the substrate, a plurality of data lines disposed on the substrate; a plurality of pixel units, and a pixel electrode. Each of the pixel units is electrically connected with the one of the scan lines and one of the data lines. At least a part of the pixel units comprises a first active device electrically connected with the pixel electrode, a second active device electrically isolated from the pixel electrode, wherein the second active device is a second TFT disposed over the scan line, and the second TFT comprises a second gate electrode electrically connected with the scan line, a second channel layer, a second source electrode electrically connected with the data line, and a second drain electrode electric ally isolated from the pixel electrode. The second channel layer is disposed at the intersection of the scan line and the data line, and the second channel layer is sandwiched between the scan line and the data line. The pixel electrode is electrically connected with one of the active devices, wherein the second drain electrode extends from the upside of the scan line to the downside of the pixel electrode along both sides of the scan line.

The invention provides an active matrix substrate including a substrate, a plurality of scan lines disposed on the substrate, a plurality of data lines disposed on the substrate; a plurality of pixel units, and a pixel electrode. Each of the pixel units is electrically connected with the one of the scan lines and one of the data lines. At least a part of the pixel units comprises a first active device electrically connected with the pixel electrode, a second active device electrically isolated from the pixel electrode, wherein the second active device is a second TFT disposed over the scan line, and the second TFT comprises a second gate electrode electrically connected with the scan line, a second channel layer, a second source electrode electrically connected with the data line, and a second drain electrode electrically isolated from the pixel electrode. The pixel electrode is electrically connected with one of the active devices, wherein the second drain electrode extends from the upside of the scan line to the downside of the pixel electrode along both sides of the scan line.

According to the active matrix substrate of an embodiment of the present invention, the first active device may be a first TFT including a first gate electrode, a first channel layer, a first source electrode and a first drain electrode. Further, the foregoing first gate electrode is electrically connected with the scan line; the first source electrode is electrically connected with the data line; and the first drain electrode is electrically connected with the pixel electrode.

According to the active matrix substrate of an embodiment of the present invention, the second drain electrode may extend from the upside of the scan line to the downside of the pixel electrode along one side of the scan line.

According to the active matrix substrate of an embodiment of the present invention, the second drain electrode may extend from the upside of the scan line to the downside of the pixel electrode along both sides of the scan line.

The invention provides a repair method for repairing a pixel unit of the foregoing active matrix substrate. The repair method includes the steps as follows. First, the connection of the first active device with the scan line and the data line is cut, such that the first active device is electrically isolated from the scan line and the data line. Then, the second active device is electrically connected to the pixel electrode.

According to the repair method of an embodiment of the present invention, the method for cutting the connection of the first active device with the scan line and the data line may be a laser cutting process.

According to the repair method of an embodiment of the present invention, the method for electrically connecting the second active device to the pixel electrode may be a laser welding process or a laser chemical vapor deposition process (Laser-CVD process).

According to the active matrix substrate of the invention, each of the pixel units includes a plurality of active devices, wherein one of the active devices is electrically connected with a pixel electrode. When the active device electrically connected with the pixel electrode fails to operate, another active device (for example, a redundant active device) may be employed to substitute the active device that is electrically connected with the pixel electrode originally for making the pixel unit to normally operate, thus bright dot defect on the LCD panel may be avoided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The First Embodiment

Figure 1A:
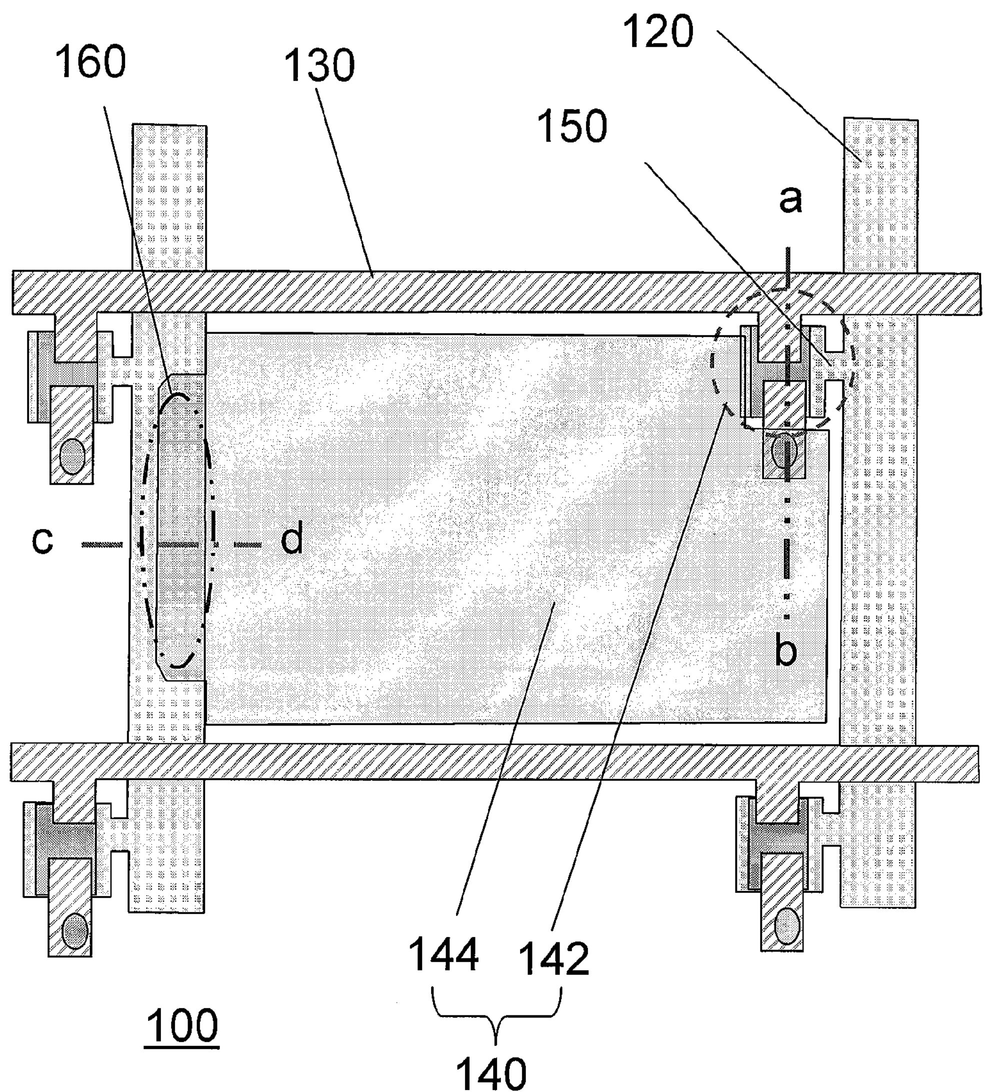
FIG. 1A is a top view of a conventional TFT array substrate.
Figure 1B:
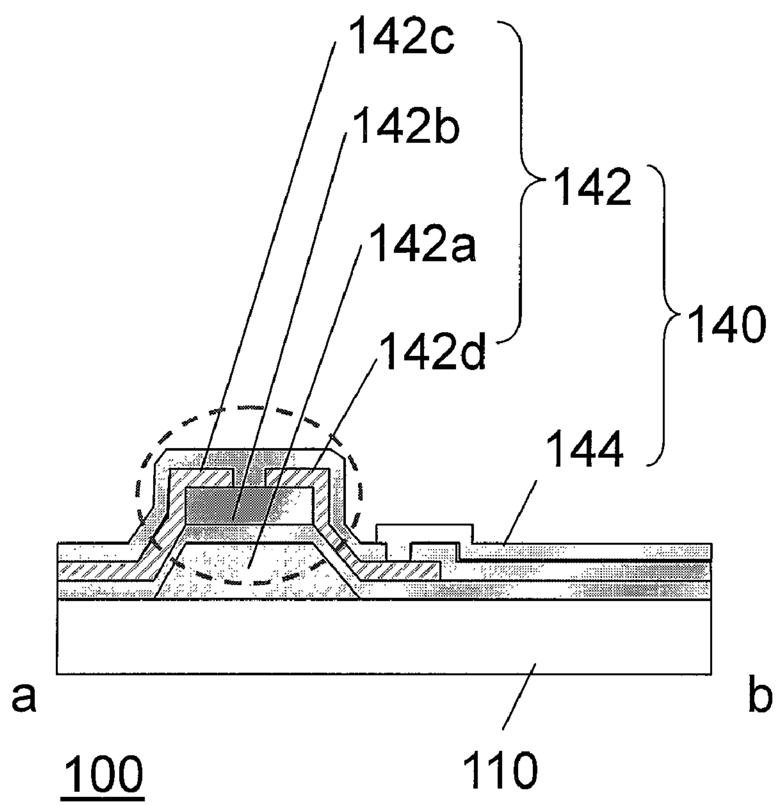
FIGS. 1B and 1C are cross-sectional views of FIG. 1A respectively along with line a-b and line c-d.
Figure 1C:
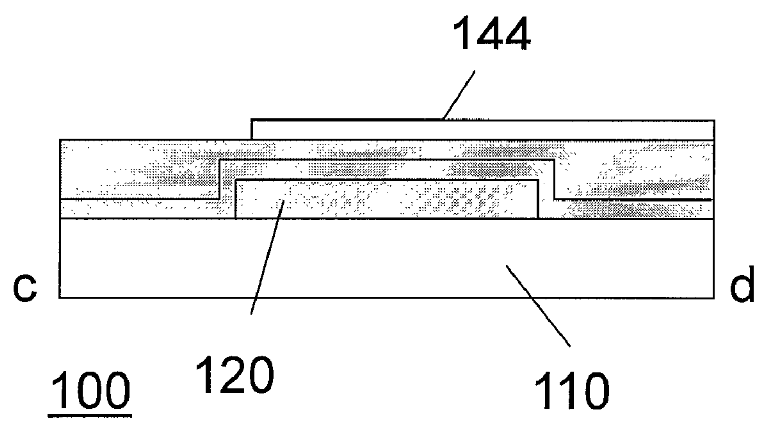
Figure 2A:
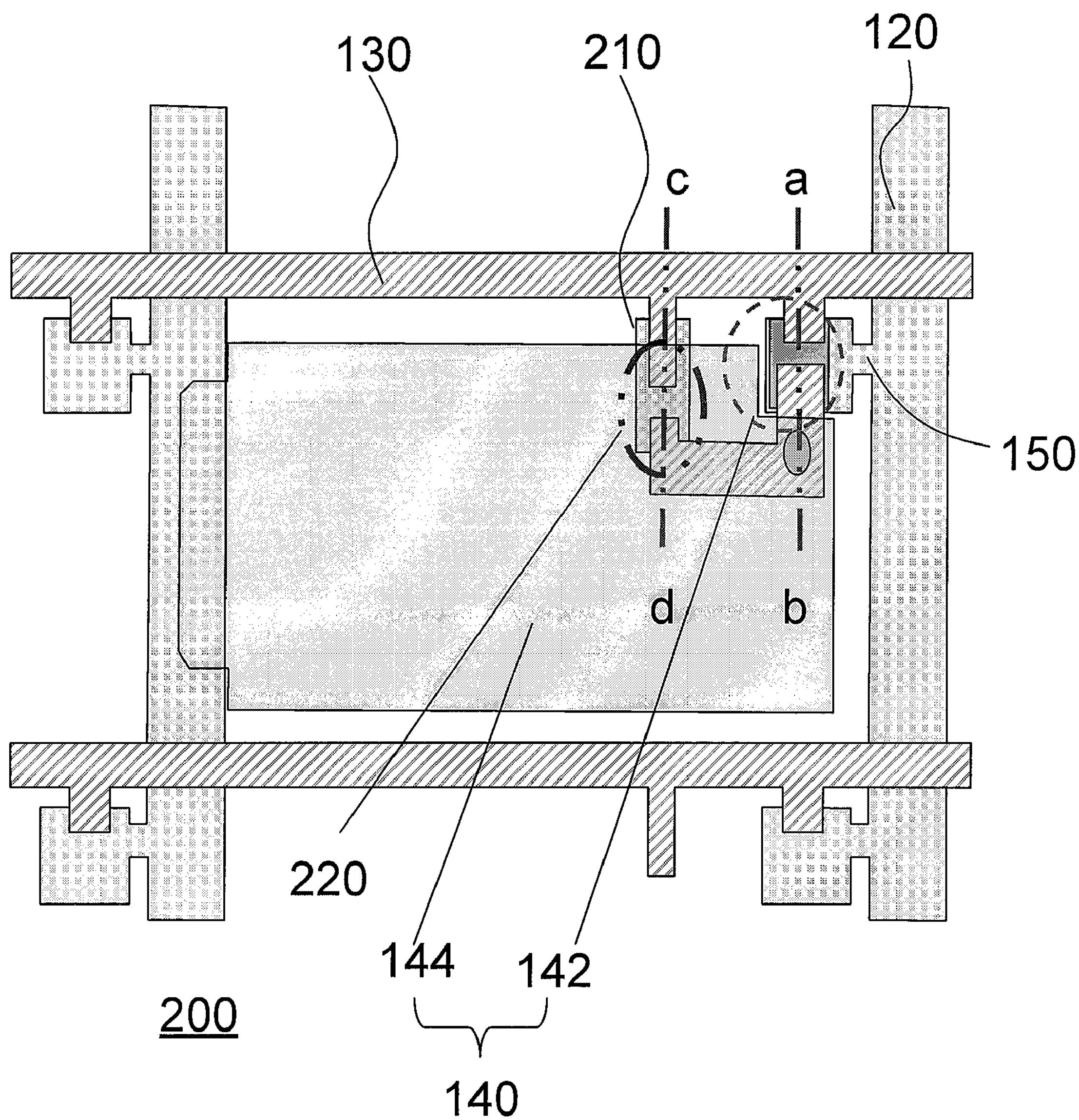
FIG. 2A is a top view of another conventional TFT array substrate.
Figure 2B:
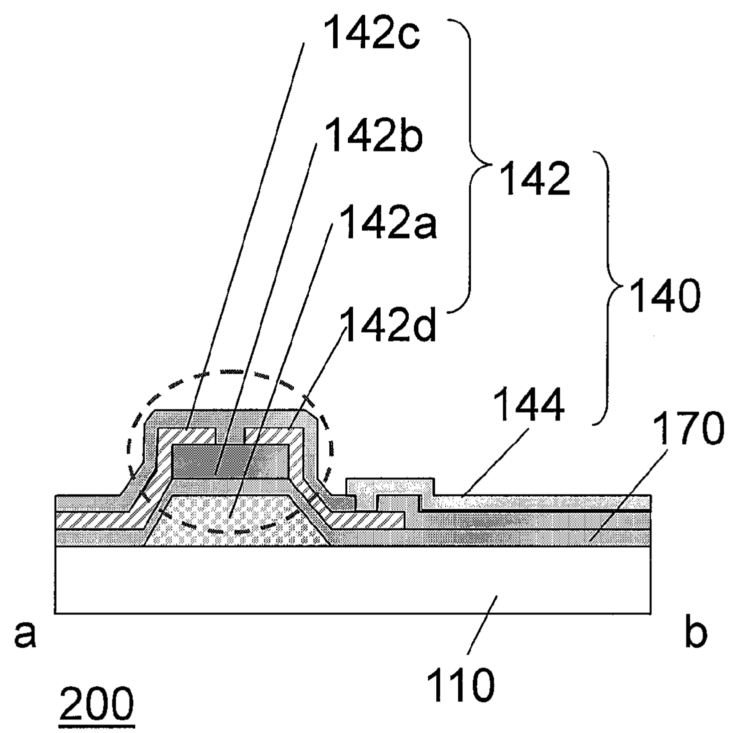
FIGS. 2B and 2C are cross-sectional views of FIG. 2A respectively along with line a-b and line c-d.
Figure 2C:
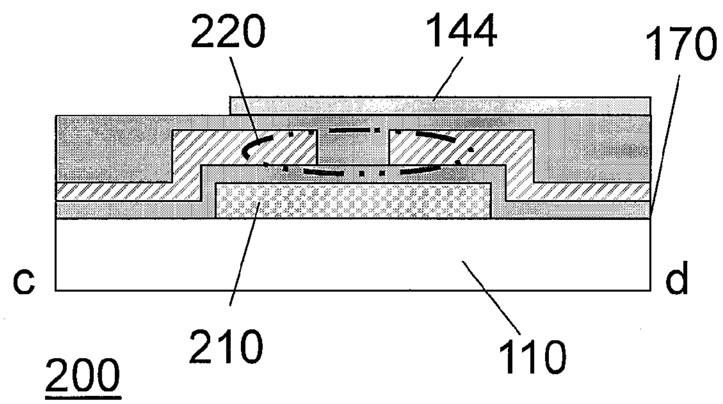
Figure 3A:
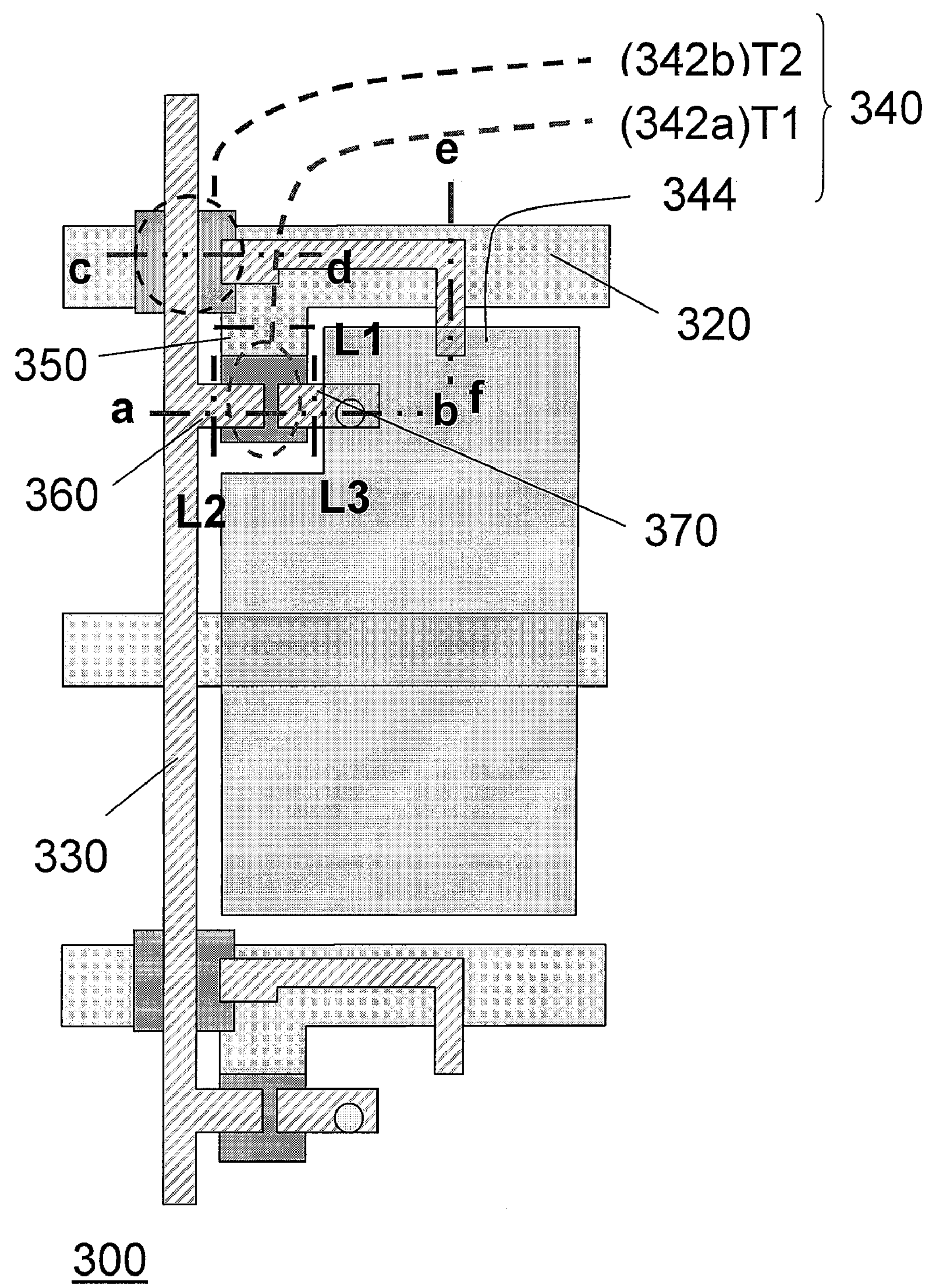
FIG. 3A is a top view of an active matrix substrate according to the first embodiment of the invention.
Figure 3B:
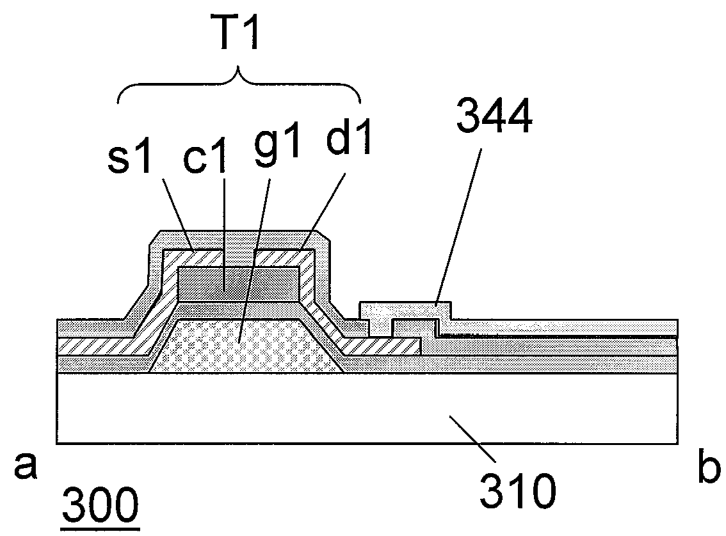
FIGS. 3B, 3C and 3D are cross-sectional views of FIG. 3A respectively along with line a-b, line c-d and line e-f.
Figure 3C:
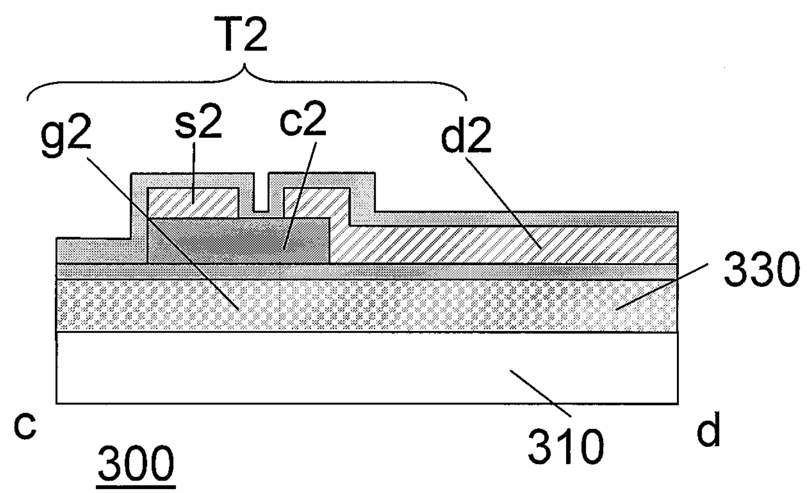
Figure 3D:
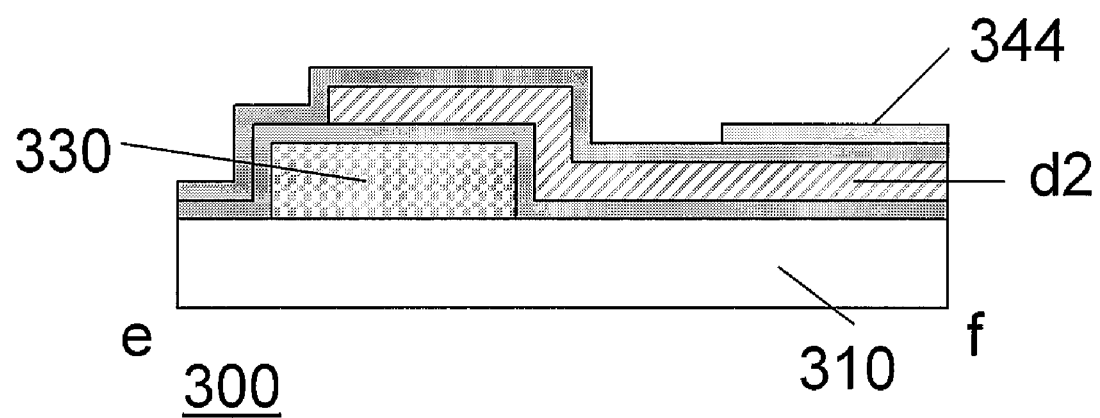

FIG. 3A is a top view of an active matrix substrate according to the first embodiment of the invention. FIGS. 3B, 3C and 3D are cross-sectional views of FIG. 3A respectively along with line a-b, line c-d and line e-f. Referring to FIGS. 3A to 3D together, an active matrix substrate 300 includes a substrate 310, a plurality of scan lines 320, a plurality of data lines 330, a plurality of pixel units 340. All of the scan lines 320, the data lines 330, the pixel units are disposed on the substrate 310.

The substrate 310 may be a glass substrate, a quarts substrate or other transparent substrate. The scan lines may be conductive lines made of aluminum alloy or other conductive materials. The data lines 330 may be conductive lines made of chromium, aluminum alloy or other conductive materials. In details, the extending direction of the scan lines 320 may be perpendicular with the extending direction of the data lines 330 for defining a plurality of pixel regions (not shown) on the substrate 310, and the pixel units 340 is disposed in the pixel regions.

It can be known from FIG. 3A, the pixel units 340 are electrically connected with the corresponding scan lines 320 and data lines 330 respectively. Each of the pixel units 340 includes a first active device 342*a*, a second active device 342*b* and a pixel electrode 344. The first active device 342*a* and the second active device 342*b* are respectively electrically connected with the scan line 320 and the data line 330, while the pixel electrode 344 is electrically connected with one of the active devices 342*a*. It is to be noted that although the embodiment uses two active devices herein as an example for illustrating the invention, the pixel units 340 according to the invention may adopt three or more active devices if necessary. Furthermore, the pixel electrode 344 may be a transmissive electrode, a reflective electrode or a transflective electrode. As described, the material of the pixel electrode 344 may be indium tin oxide (ITO), indium zinc oxide (IZO), metal or other conductive materials.

According to the embodiment, the first active device 342*a* is a first TFT T1 and the second active device 342*b* is a second TFT T2. The first TFT T1 is electrically connected with the pixel electrode 344, and the second TFT T2 is electrically isolated from the pixel electrode 344. It should be noted that in the present invention when a pixel unit 340 adopts three or more than three active devices, only one is electrically connected with the pixel electrode 344 and the others (i.e., redundant active devices) are electrically isolated from the pixel electrode 344.

Further, the first TFT T1 includes a first gate electrode g1, a first channel layer c1, a first source electrode s1 and a first drain electrode d1. The first gate electrode g1 is electrically connected with the scan line 320, and the material of the gate electrode g1 is the same with the scan lines 320. The material of the first channel layer c1 may be amorphous silicon, polycrystalline silicon or mono-crystalline silicon. The first source electrode s1 is electrically connected with the data line 330, and the material of the first source electrode s1 is the same with the data lines 330. The first drain electrode d1 is electrically connected with the pixel electrode 344, the material of the first drain electrode d1 is the same with the data lines 344. Similarly, the second TFT T2 includes a second gate electrode g2, a second channel layer c2, a second source electrode s2 and a second drain electrode d2. The material of the second gate electrode g2, the second channel layer c2, the second source electrode s2 and the second drain electrode d2 are the same as described in TFT T1. Moreover, the second gate electrode g2 is electrically connected with the scan line 320; the second source electrode s2 is electrically connected with the data line 330; and the second drain electrode d2 is electrically isolated from the pixel electrode 344.

It should be noted that the second TFT T2 of the present embodiment is disposed over the scan line 320 and the second channel layer c2 of the second TFT T2 is disposed at the intersection of the scan line 320 and the data line 330, such that the second channel layer c2 is sandwiched between the scan line 320 and the data line 330. Furthermore, the second drain electrode d2 of the present embodiment extends from the upside of the scan line 320 to the downside of the pixel electrode 344 along a side of the scan line 320.

When the first TFT T1 is damaged that causes abnormal operation of the pixel unit 340, a bright dot defect on the LCD panel will be occurred after the active matrix substrate 300 and a color filter substrate are assembled and the liquid crystal is filled. A laser repairing process is needed for repairing the pixel unit 340. Again referring to FIGS. 3A to 3D, the first step of the repairing process is cutting at least one of the connection 350 between the first TFT T1 and the scan line 320, the connection 360 between the first TFT T1 and the data line 330 and the connection 370 between the first TFT T1 and the pixel electrode 344 via a laser cutting process, for example. When the connection 350 between the first TFT T1 and the scan line 320 is cut along with a cutting line L1, the first TFT T1 is electrically isolated from the scan line 320. When the connection 360 between the first TFT T1 and the data line 330 is cut along with a cutting line L2, the first TFT T1 is electrically isolated from the data line 330. When the connection 370 between the first TFT T1 and the pixel electrode 344 is cut along with a cutting line L3, the first TFT T1 is electrically isolated from the pixel electrode 344. According to the present embodiment, the method for cutting the connections 350, 360 and 370 may be a laser cutting process.

After the connections 350, 360 or 370 is cut, the second TFT T2 is to be electrically connected to the pixel electrode 344 by welding the second drain electrode d2 with the pixel electrode 344 via a laser welding process. In an alternately embodiment of the present invention, the second TFT T2 is to be electrically connected to the pixel electrode 344 by burning off the passivation layer above the second drain electrode d2 via laser and then forming a thin metal layer by laser CVD process. Such a repaired pixel unit will not cause a bright dot defect on the LCD panel.

The Second Embodiment

Figure 4A:
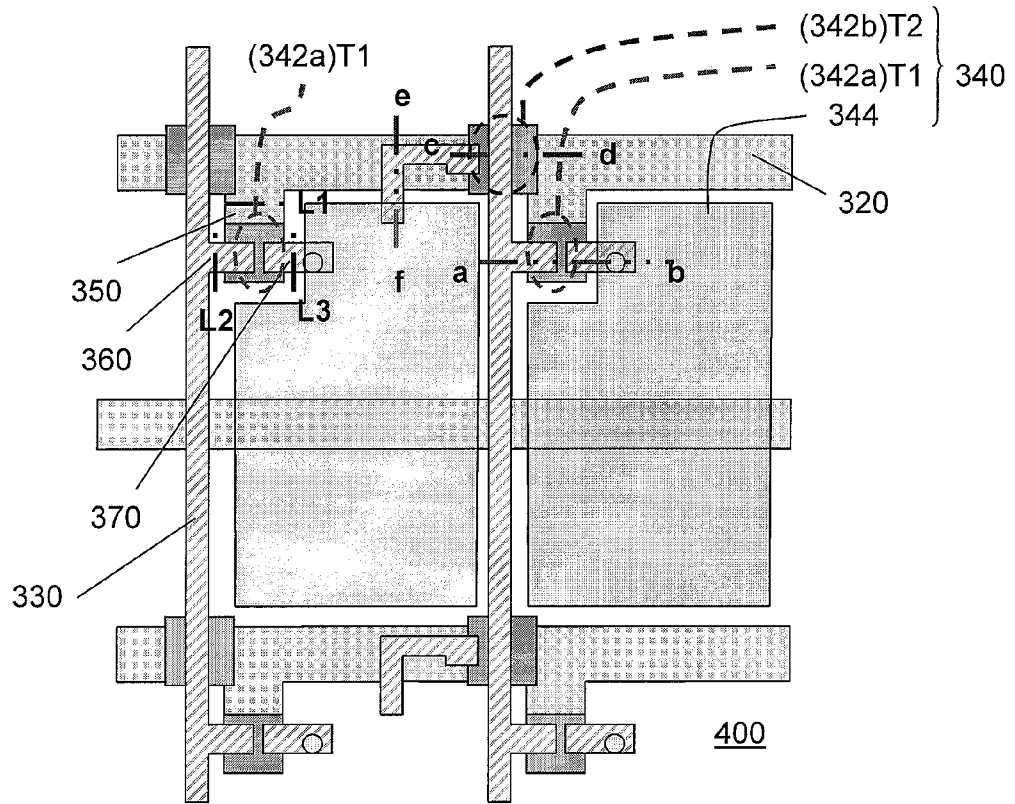
FIG. 4A is a top view of an active matrix substrate according to the second embodiment of the invention.
Figure 4B:
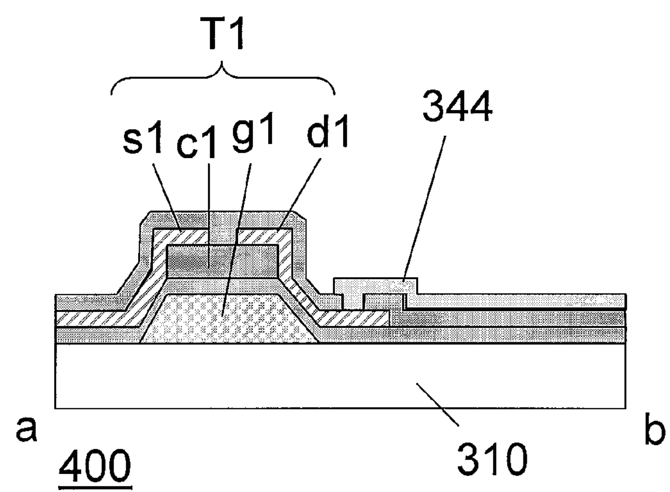
FIGS. 4B, 4C and 4D are cross-sectional views of FIG. 4A respectively along with line a-b, line c-d and line e-f.
Figure 4C:
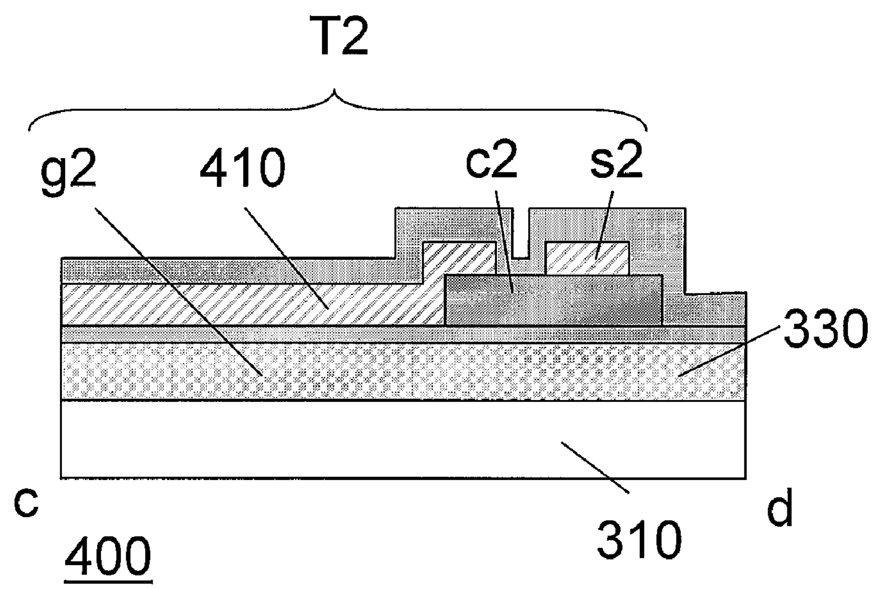
Figure 4D:
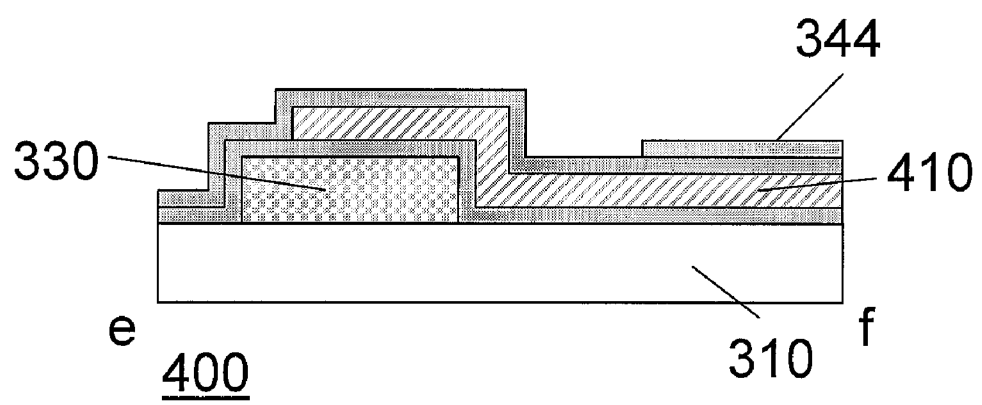

FIG. 4A is a top view of an active matrix substrate according to the second embodiment of the invention, which is a modification from FIG. 3A. FIGS. 4B, 4C and 4D are cross-sectional views of FIG. 4A respectively along with line a-b, line c-d and line e-f. Referring to FIGS. 4A to 4D together, the active matrix substrate 400 of the embodiment is similar to the active matrix substrate 300 of the first embodiment except that the second drain electrode 410 of the active matrix substrate 400 of the present embodiment is disposed in an adjacent pixel unit 340 extending from the upside of the scan line 320 to the downside of an adjacent pixel electrode 344 along one side of the scan line 320.

Referring to FIGS. 4A to 4D, when a first TFT T1 of the adjacent pixel unit 340 (the first TFT T1 shown at the left side in FIG. 4A) is damaged, a laser cutting process is performed to cut at least one of the connection 350 between the first TFT T1 and the scan line 320, the connection 360 between the first TFT T1 and the data line 330, and the connection 370 between the first TFT T1 and the pixel electrode 344. Herein, when the connection 350 between the first TFT T1 and the scan line 320 is cut along with a cutting line L1, the first TFT T1 is electrically isolated from the scan line 320. When the connection 360 between the first TFT T1 and the data line 330 is cut along with a cutting line L2, the first TFT T1 is electrically isolated from the data line 330. When the connection 370 between the first TFT T1 and the pixel electrode 344 is cut along with a cutting line L3, the first TFT T1 is electrically isolated from the pixel electrode 344. According to the embodiment, the method for cutting the connections 350, 360 and 370 may be a laser cutting process.

It should be noted that, because the second drain electrode 410 of the second TFT T2 is disposed in an adjacent pixel unit 340 and extends from the upside of the scan line 320 towards an adjacent pixel unit 340 to the downside of the pixel electrode 344, the second TFT T2 should be electrically connected with the pixel electrode 344 shown at the left side of FIG. 4A. The method to electrically connect the second drain electrode 410 of the second TFT T2 together with the pixel electrode 344 at the left side of FIG. 4A may be a laser welding process. Another method for electrically connecting the second drain electrode 410 of the second TFT T2 together with the pixel electrode 344 at the left side of FIG. 4A may be burning off the passivation layer above the second drain electrode 410 of the second TFT T2 via laser and then forming a thin metal layer by a laser CVD process.

The Third Embodiment

Figure 5A:
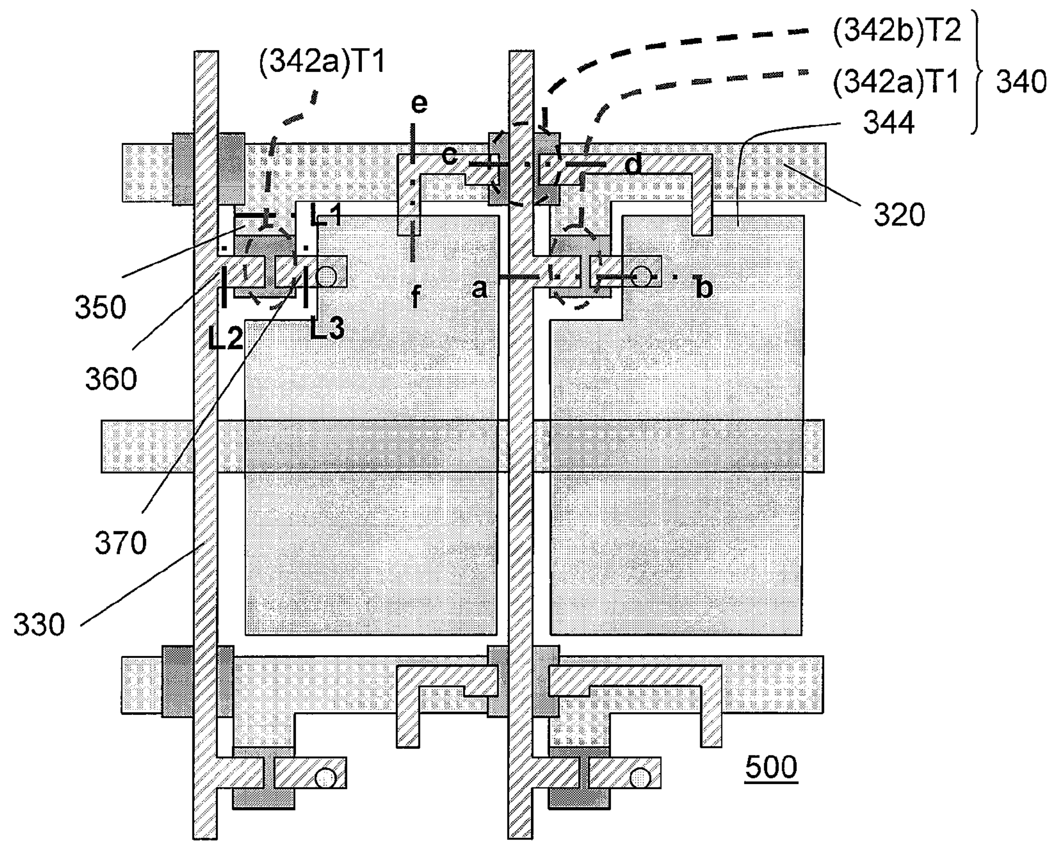
FIG. 5A is a top view of an active matrix substrate according to the third embodiment of the invention.
Figure 5B:
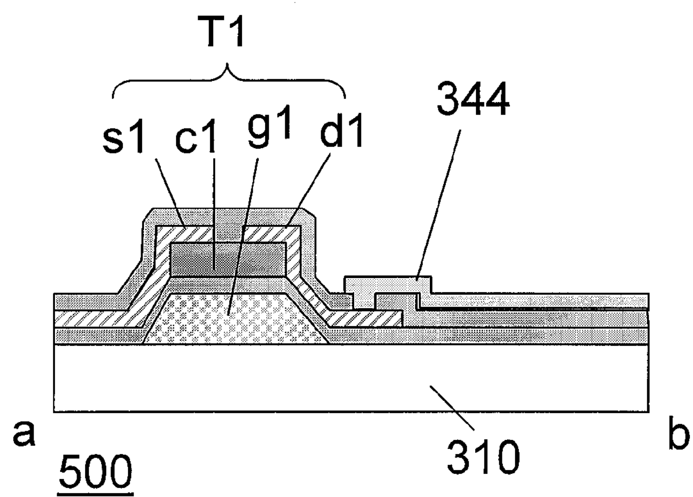
FIGS. 5B, 5C and 5D are cross-sectional views of FIG. 5A, respectively, along with line a-b, line c-d and line e-f.
Figure 5C:
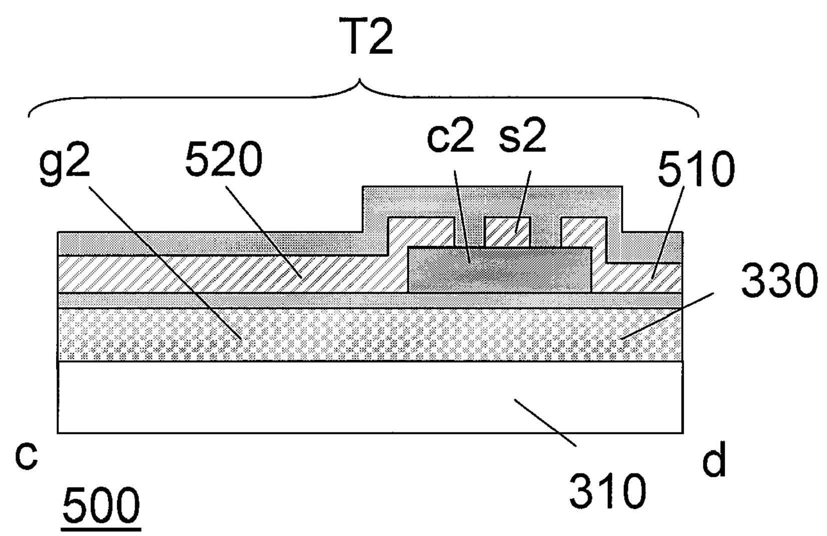
Figure 5D:
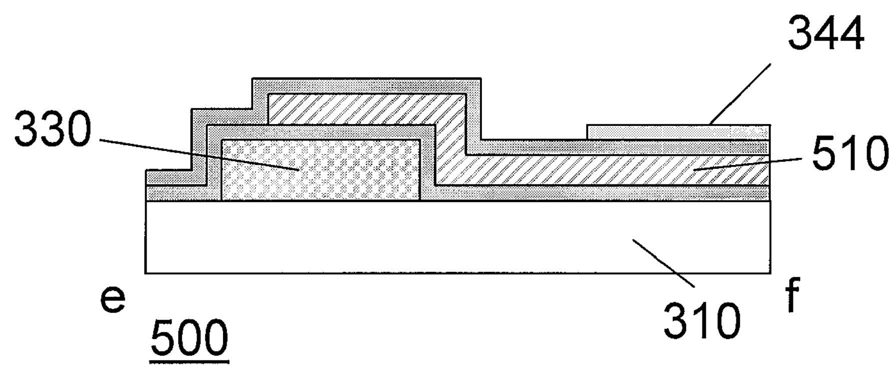

FIG. 5A is a top view of an active matrix substrate according to the third embodiment of the invention, which is a modification from FIG. 3A. FIGS. 5B, 5C and 5D are cross-sectional views of FIG. 5A respectively along with line a-b, line c-d and line e-f. Referring to FIGS. 5A to 5D together, the active matrix substrate 500 of the present embodiment is similar to the active matrix substrate 300 of the first embodiment except that the second TFT T2 of the active matrix substrate 500 of this embodiment is only formed at the intersection of the even data line 330 and the scan line 320 or only at the intersection of the odd data line 330 and the scan line 320. Thus, two adjacent pixel units 340 include a shared second TFT T2. Furthermore, the second TFT T2 of the present embodiment has two second drain electrodes 510, 520. The second drain electrode 510 and 520 are disposed in pixel units 340 adjacent to the data line 330 and are extending from the upside of the scan line 320 toward one side of the scan line 320 to the downside of the pixel electrode 344 respectively.

FIG. 5A illustrates a pair of pixel units 340. When the first TFT T1 of the right pixel unit 340 is damaged, the second drain electrode 510 may be employed for repairing the right pixel unit 340. The repairing method is the same as that of the first embodiment. When the first TFT T1 of the left pixel unit 340 is damaged, the second drain electrode 520 may be employed for repairing the left pixel unit 340. The repairing method is also the same as that of the second embodiment.

The Fourth Embodiment

Figure 6A:
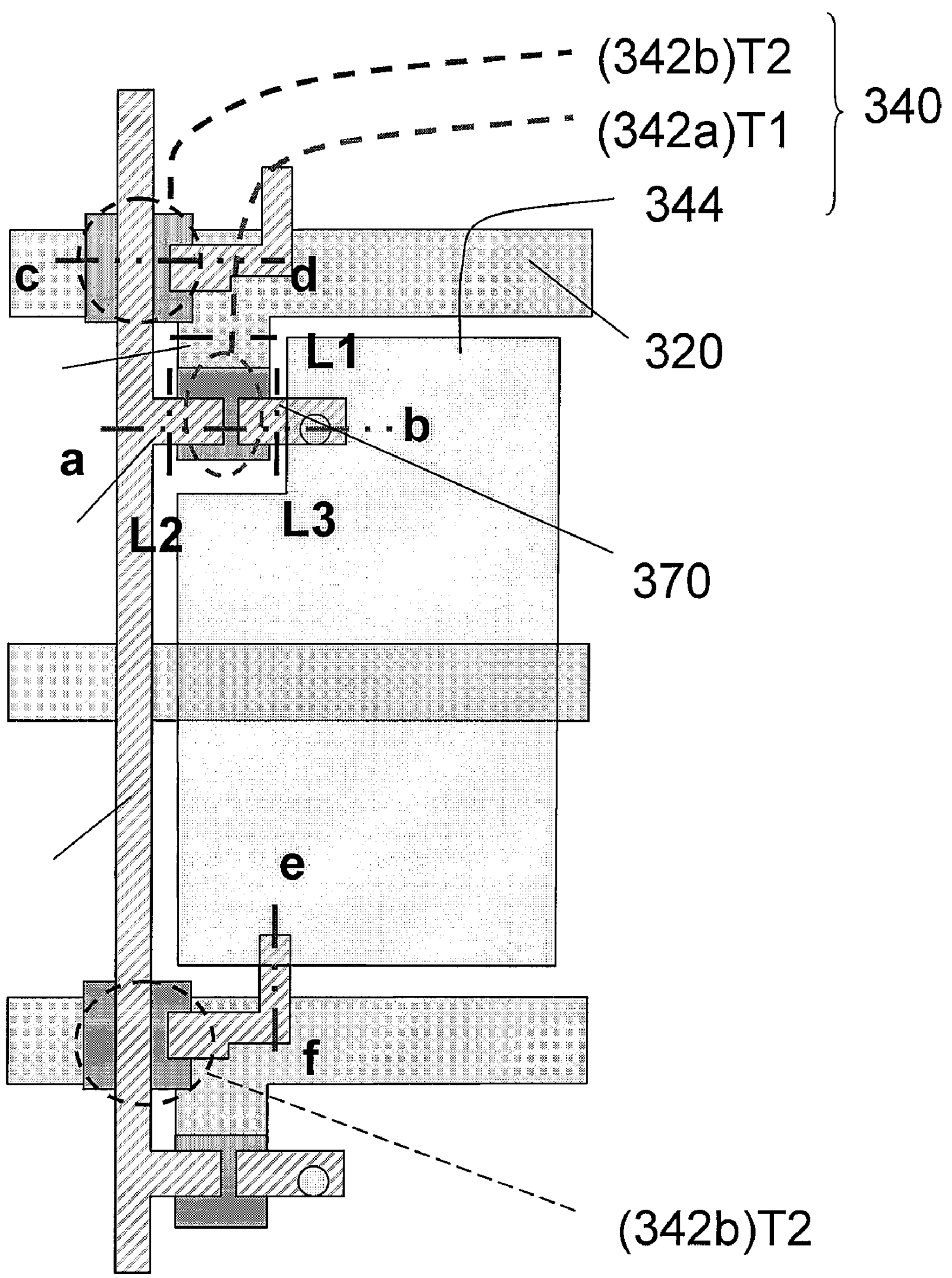
FIG. 6A is a top view of an active matrix substrate according to the fourth embodiment of the present invention.
Figure 6B:
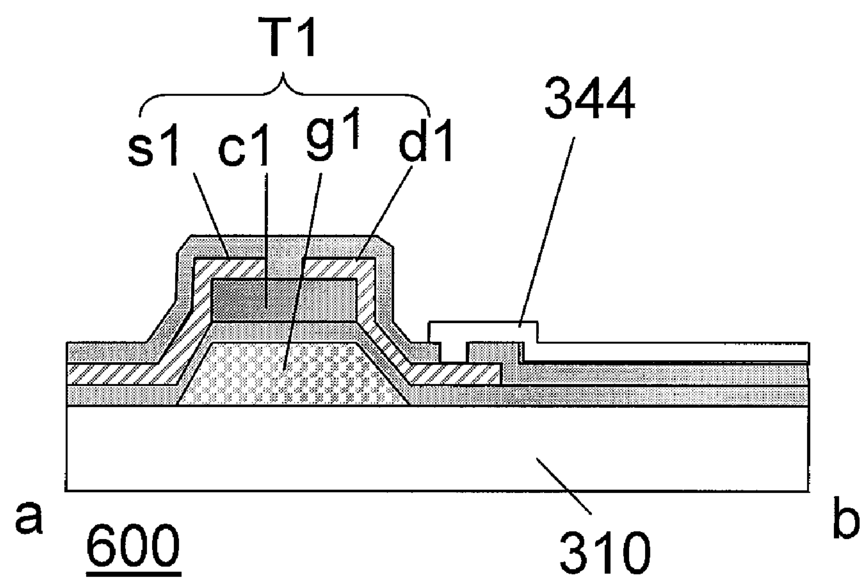
FIGS. 6B, 6C and 6D are cross-sectional views of FIG. 6A, respectively, along with line a-b, line c-d and line e-f.
Figure 6C:
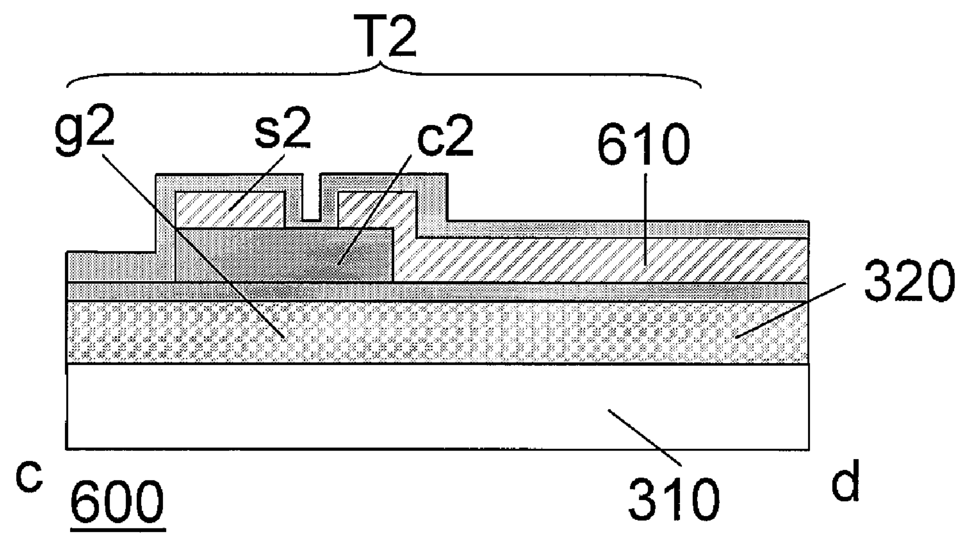
Figure 6D:
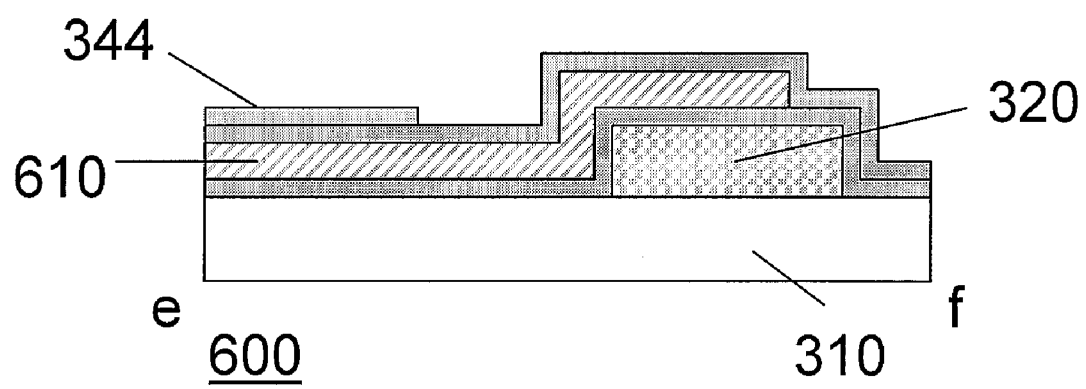

FIG. 6A is a top view of an active matrix substrate according to the fourth embodiment of the invention, which is a modification from FIG. 3A. FIGS. 6B, 6C and 6D are cross-sectional views of FIG. 6A respectively along with line a-b, line c-d and line e-f. Referring to FIGS. 6A to 6D together, the active matrix substrate 600 of the present embodiment is similar to the active matrix substrate 300 of the first embodiment except that the second drain electrode 610 extends from the upside of the scan line 320 toward one side of the scan line 320 to the downside of the pixel electrode. The extending direction is opposite to the extending direction in the first embodiment.

The repair method according to the embodiment is similar to that of the first embodiment. Referring to FIGS. 6A to 6D, when the first TFT T1 is damaged, at least one of the connection 350 between the first TFT T1 and the scan line 320, the connection 360 between the first TFT T1 and the data line 330, and the connection 370 between the first TFT T1 and the pixel electrode 344 is cut by laser cutting process. The method for cutting the connections 350, 360 and 370 may be a laser cutting process. It should be noted that because the second drain electrode 610 of the second TFT T2 extends upwardly from the upside of the scan line 320 to the downside of the pixel electrode 344. The second TFT T2 shown at the downside in FIG. 6A should be electrically connected with the pixel electrode 344. The method to electrically connect the second drain electrode 610 of the second TFT T2 at the downside of FIG. 6A together with the pixel electrode 344 may be a laser welding process. Another method for electrically connecting the second drain electrode 610 of the second TFT T2 at the downside of FIG. 6A together with the pixel electrode 344 may be burning off the passivation layer above the second drain electrode 610 of the second TFT T2 at the downside of FIG. 6A via laser and then forming a thin metal layer by a laser CVD process.

The Fifth Embodiment

Figure 7A:
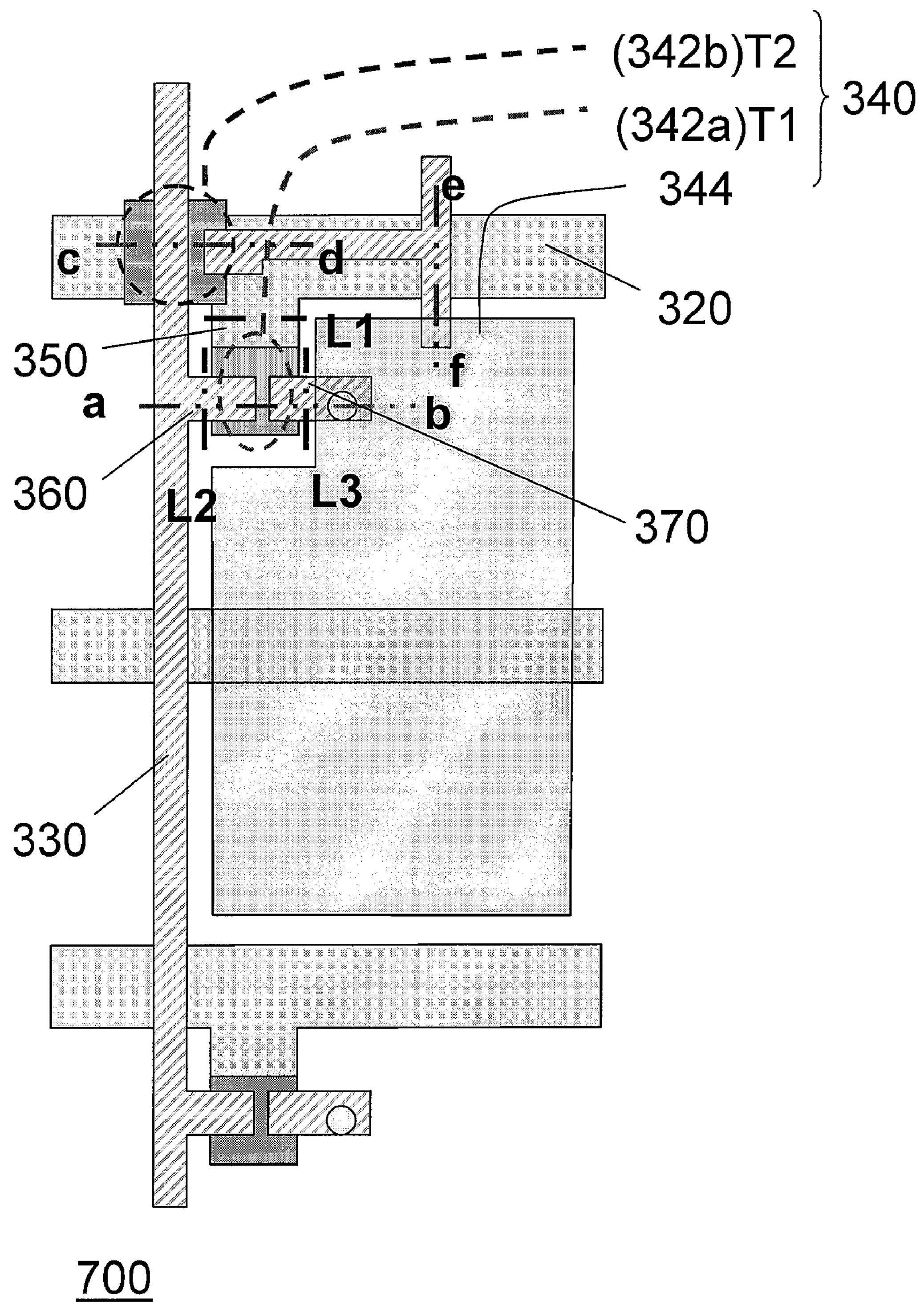
FIG. 7A is a top view of an active matrix substrate according to the fifth embodiment of the present invention.
Figure 7B:
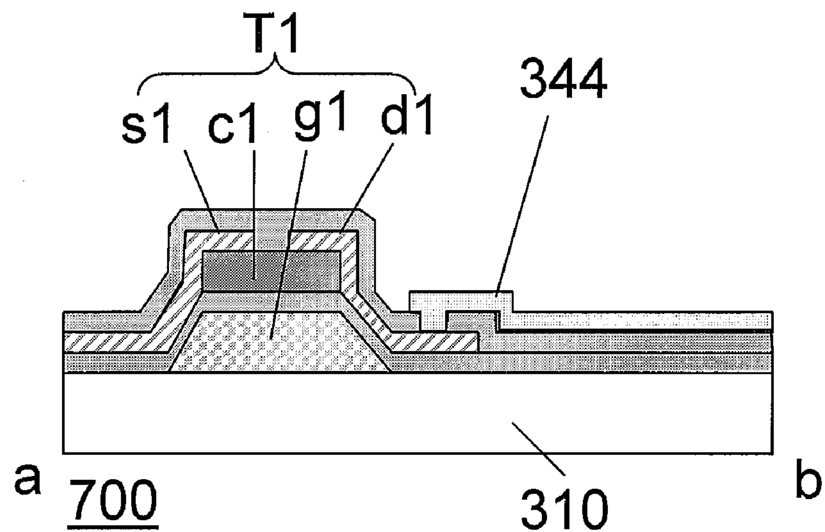
FIGS. 7B, 7C and 7D are cross-sectional views of FIG. 7A, respectively, along with line a-b, line c-d and line e-f.
Figure 7C:
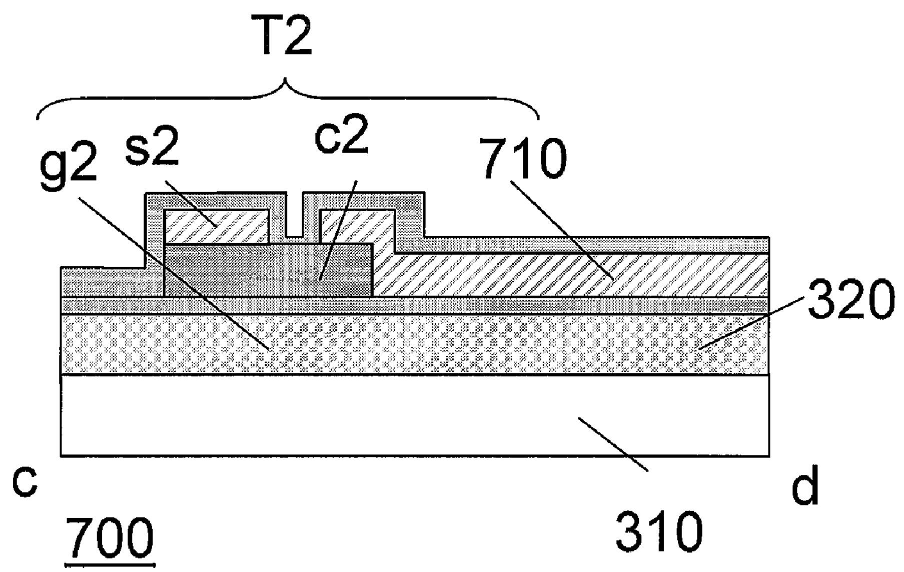
Figure 7D:
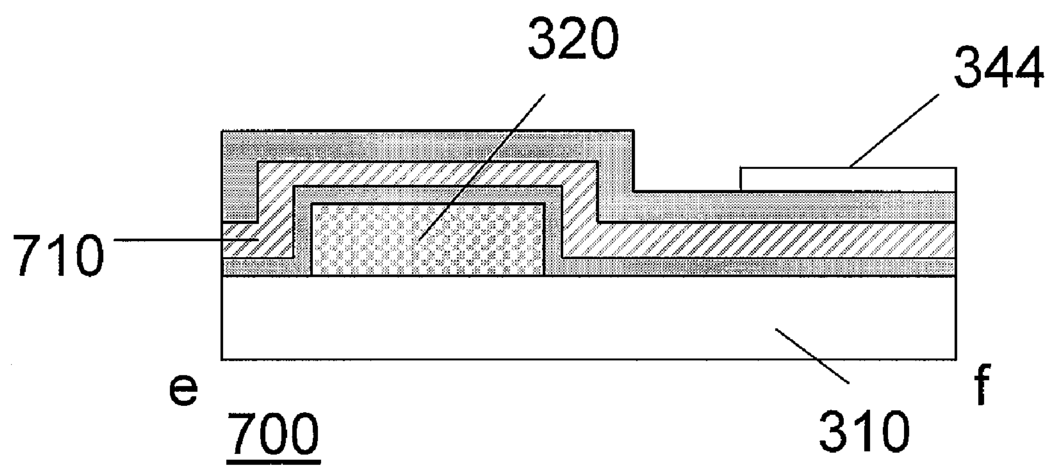

FIG. 7A is a top view of an active matrix substrate according to the fifth embodiment of the invention, which is a modification from FIG. 3A. FIGS. 7B, 7C and 7D are cross-sectional views of FIG. 7A respectively along with line a-b, line c-d and line e-f. Referring to FIGS. 7A to 7D together, the active matrix substrate 700 of the present embodiment is similar to the active matrix substrate 300 of the first embodiment. According to the active matrix substrate 300 of the first embodiment, each of the pixel units 344 has a second TFT T2. However, according to the active matrix substrate 700 of the present embodiment, the second TFT T2 only forms at the intersection of the odd scan line 320 and the data line 330 or only at the intersection of the even scan line 320 and the data line 330. Therefore, every pair of pixel units 340 which are up and down next to each other has a shared second TFT T2. Furthermore, the second drain electrode 710 of the second TFT T2 of the embodiment extends from the upside of the scan lines 320 toward both sides of the odd or even scan line 320 to the downside of the pixel electrode 344. It should be noted that although the second TFT T2 forms only at the intersection of the odd scan line 320 and the data line 330 or only at the intersection of the even scan line 320 and the data line 330, the second channel layer c2 may be formed at the intersection of the scan line 320 and the data line 330 where no second TFT T2 is formed.

Referring to FIGS. 7A to 7D again, when one first TFT T1 of the pair of the pixel units which are up and down next to each other is damaged, at least one of the connection 350 between the first TFT T1 and the scan line 320, the connection 360 between the first TFT T1 and the data line 330, and the connection 370 between the first TFT T1 and the pixel electrode 344 is cut by laser cutting process. Next, a laser welding method is employed for electrically connecting the second drain electrode 710 of the second TFT T2 with the pixel electrode 344. The method to electrically connect the second drain electrode 710 of the second TFT T2 with the pixel electrode 344 may be accomplished by performing a laser welding process or a laser CVD process. Because a pair of such pixel units which are up and down next to each other have a shared second TFT T2 and the second drain electrode 710 of the second TFT T2 extends from the upside of the scan line 320 towards both sides of the scan line 320 to the downside of the pixel electrode 344, when any first TFT T1 of a pair of pixel units which are next to each other is damaged, the shared second TFT T2 can substitute the damaged first TFT T1.

The Sixth Embodiment

Figure 8A:
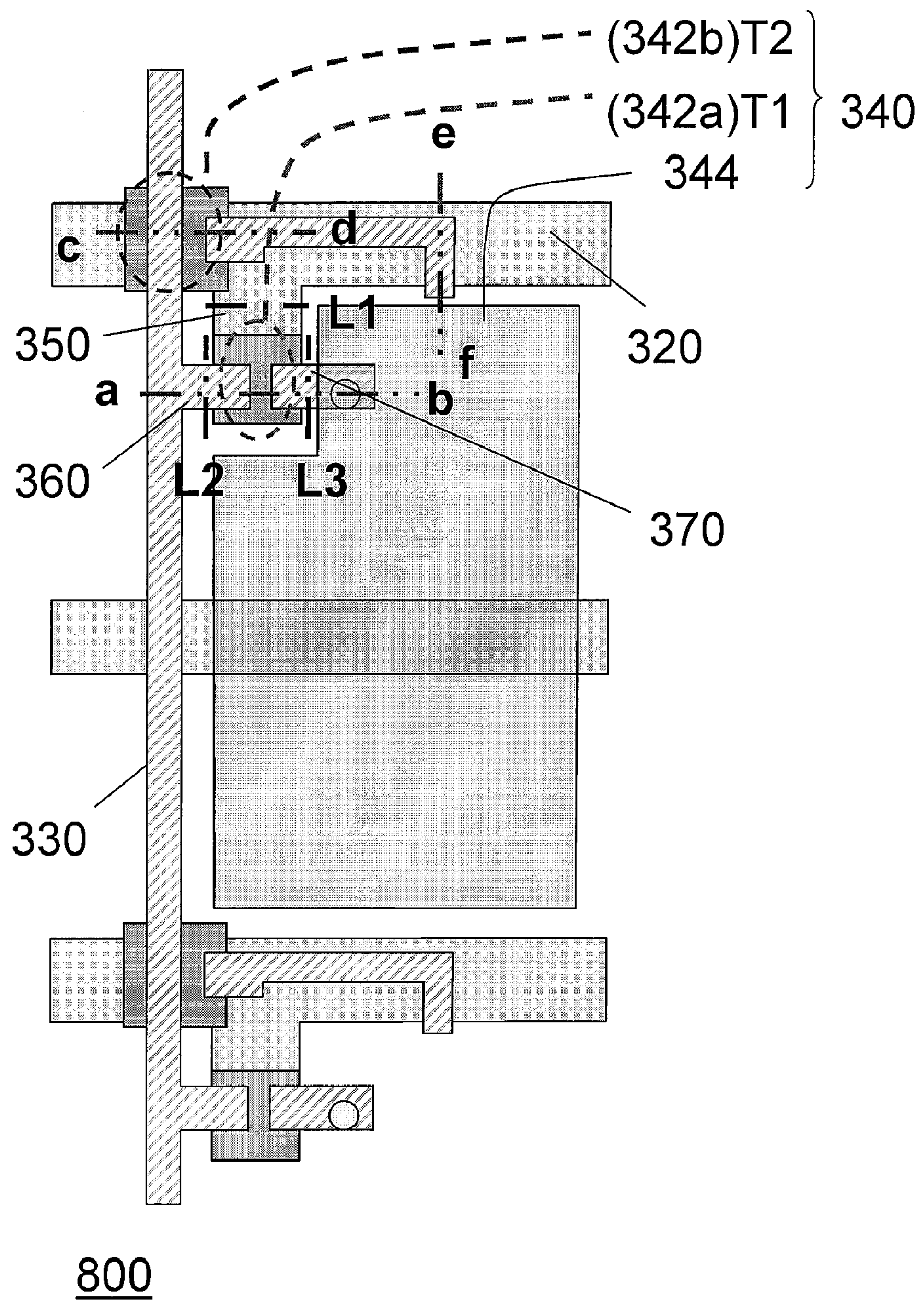
FIG. 8A is a top view of an active matrix substrate according to the sixth embodiment of the present invention.
Figure 8B:
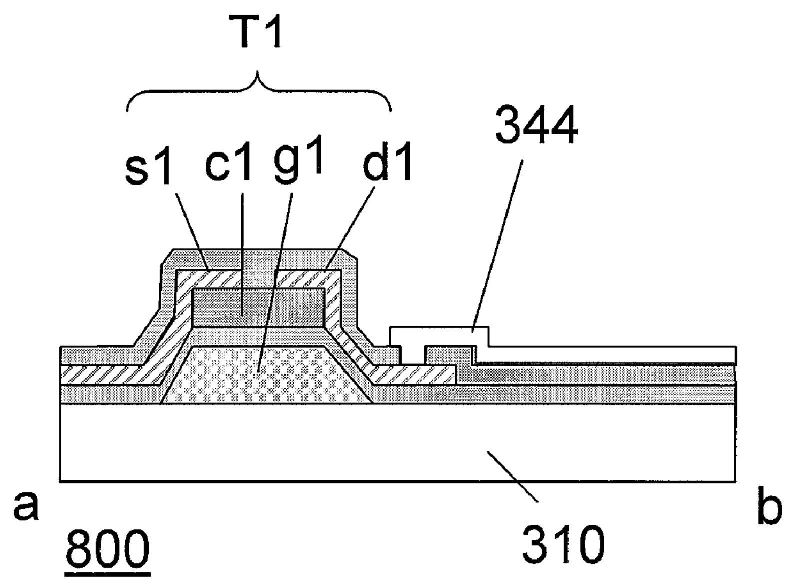
FIGS. 8B, 8C and 8D are cross-sectional views of FIG. 8A, respectively, along with line a-b, line c-d and line e-f.
Figure 8C:
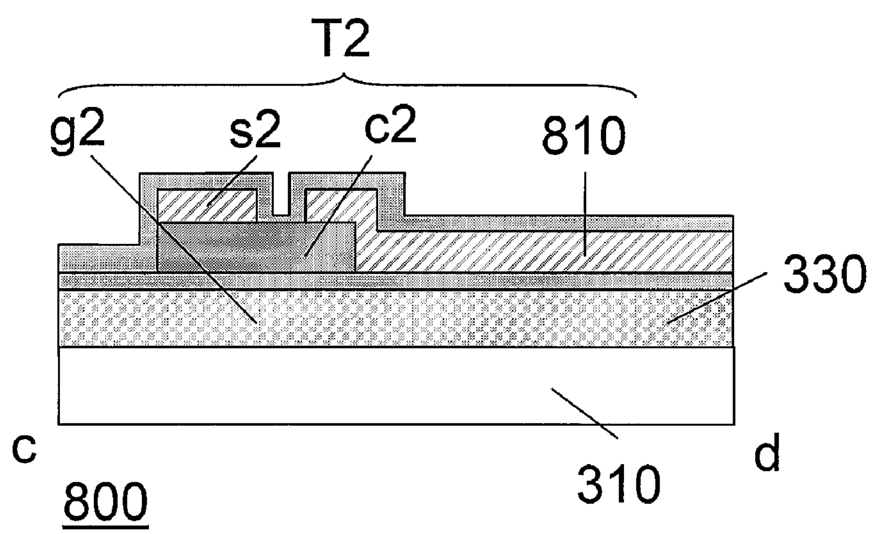
Figure 8D:
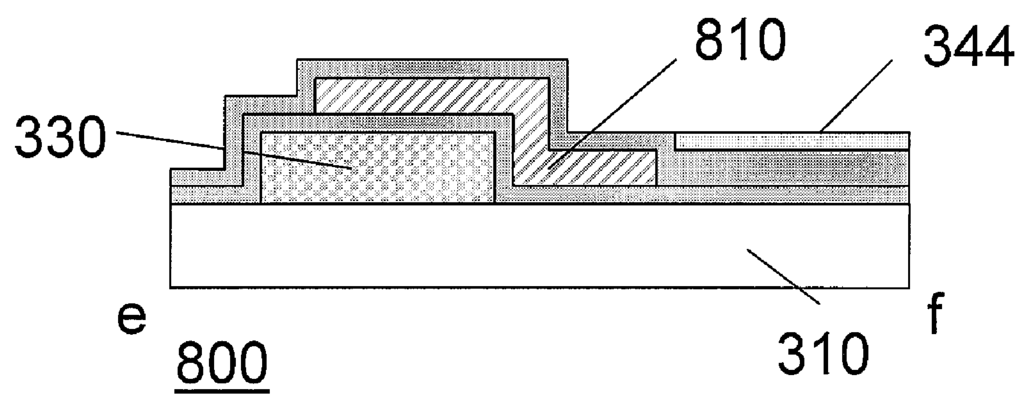

FIG. 8A is a top view of an active matrix substrate according to the sixth embodiment of the invention, which is a modification of FIG. 3A. FIGS. 8B, 8C and 8D are cross-sectional views of FIG. 8A respectively along with line a-b, line c-d and line e-f. Referring to FIGS. 8A to 8D together, the active matrix substrate 800 of the present embodiment is similar to the active matrix substrate 300 of the first embodiment. The main difference is that the second drain electrode 810 extends from the upside of the scan lines 320 toward one side of the scan line 320 without reaching to the downside of the pixel electrode 344.

Referring to FIGS. 8A to 8D again, when the first TFT T1 is damaged, at least one of the connection 350 between the first TFT T1 and the scan line 320, the connection 360 between the first TFT T1 and the data line 330, and the connection 370 between the first TFT T1 and the pixel electrode 344 is cut by laser cutting process. Then the second TFT T2 is to be electrically connected with the pixel electrode 344. However, according to the present embodiment, because the second drain electrode 810 does not extend to the downside of the pixel electrode 344, the passivation layer above the second drain electrode 810 has to be burned off by laser before performing a laser CVD process to form a thin metal layer for electrically connecting the second drain electrode 810 with the pixel electrode 344. In other words, in the present embodiment, only a laser CVD process can be employed to repair the pixel unit 340.

The Seventh Embodiment

Figure 9A:
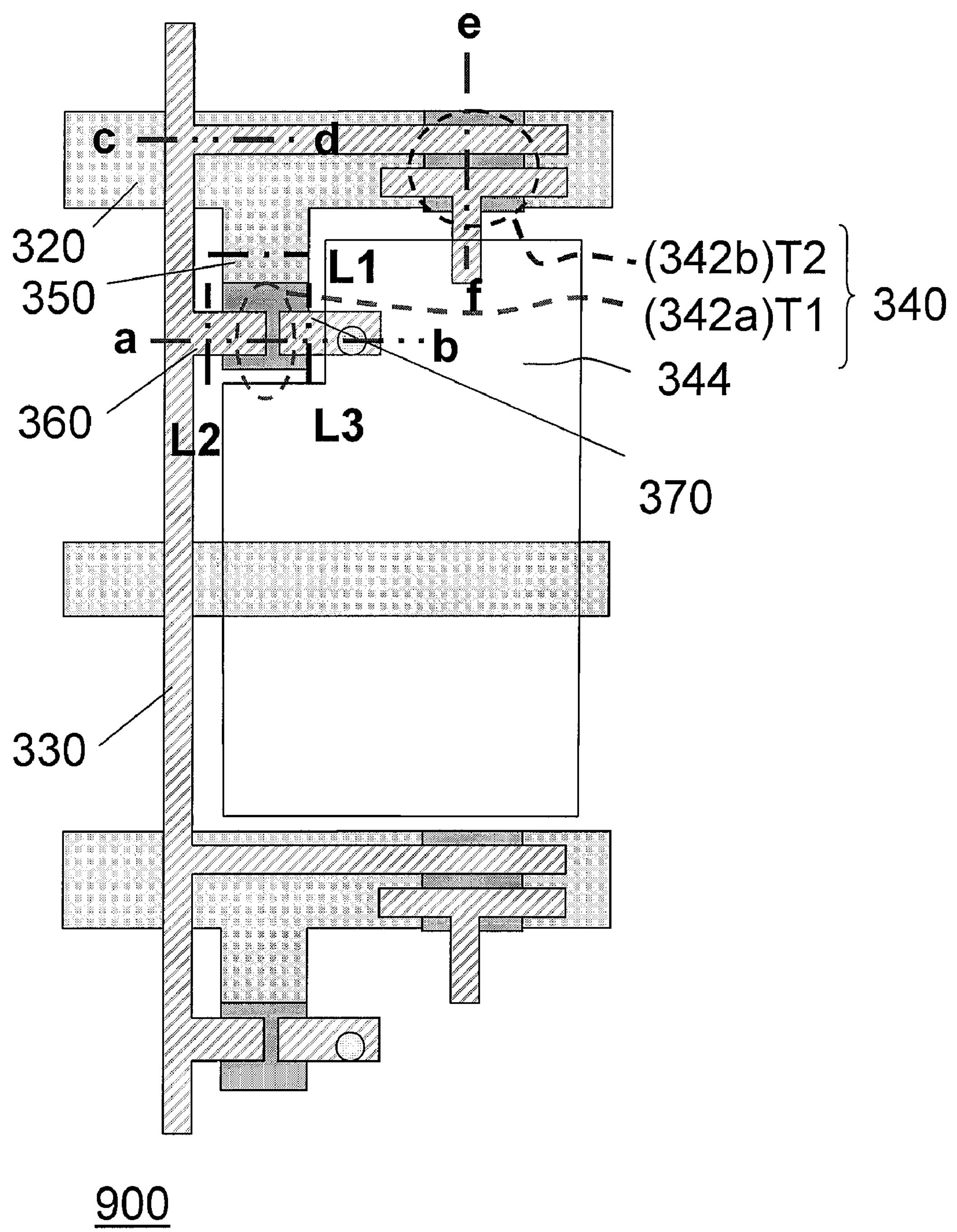
FIG. 9A is a top view of an active matrix substrate according to the seventh embodiment of the present invention.
Figure 9B:
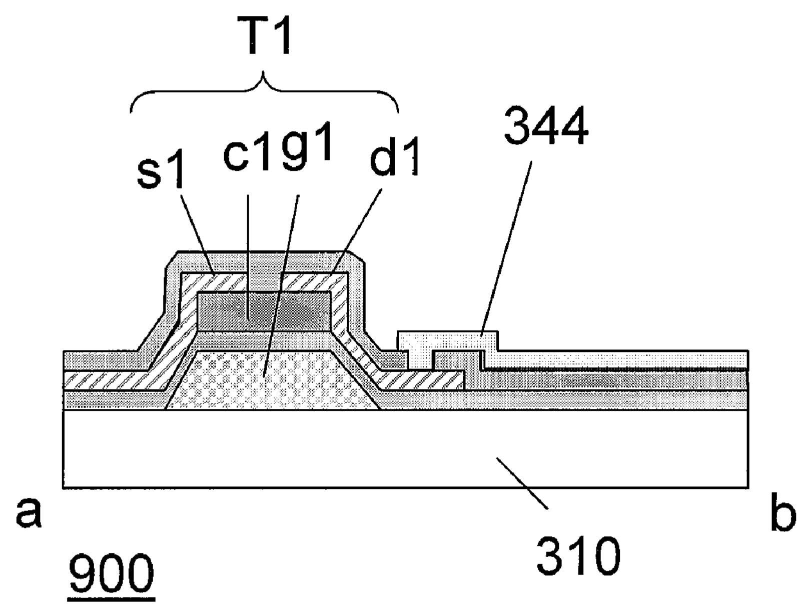
FIGS. 9B, 9C and 9D are cross-sectional views of FIG. 9A, respectively, along with line a-b, line c-d and line e-f.
Figure 9C:
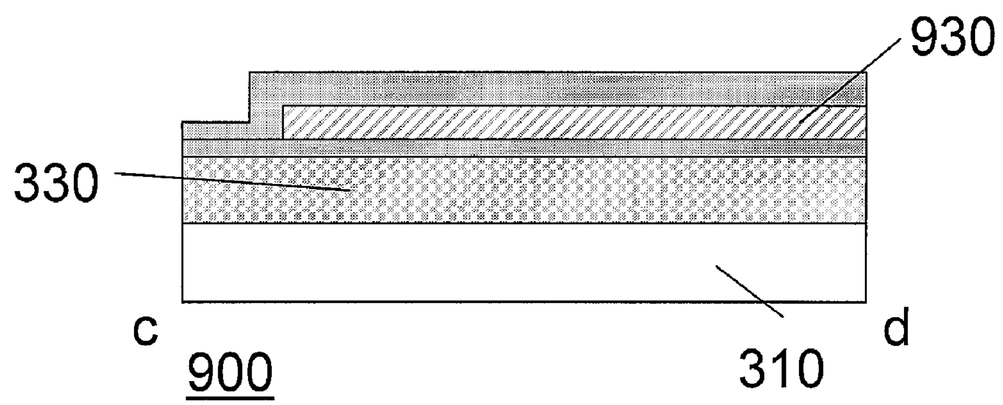
Figure 9D:
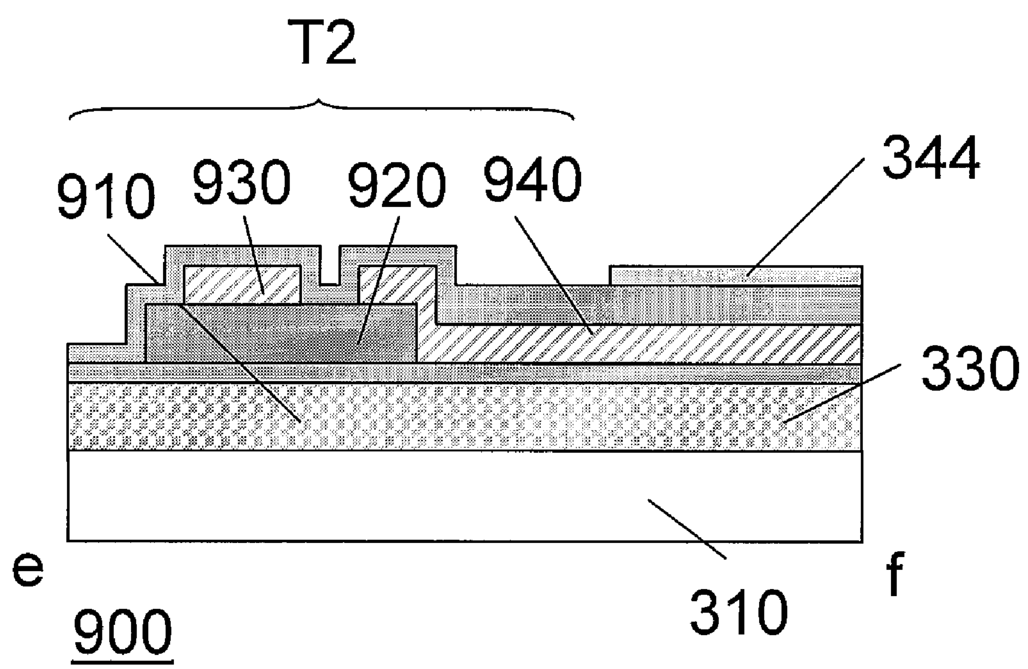

FIG. 9A is a top view of an active matrix substrate according to the seventh embodiment of the invention, which is a modification from FIG. 3A. FIGS. 9B, 9C and 9D are cross-sectional views of FIG. 9A respectively along with line a-b, line c-d and line e-f. Referring to FIGS. 9A to 9D together, the active matrix substrate 900 of the embodiment is similar to the active matrix substrate 300 of the first embodiment. The second TFT T2 is disposed over the scan lines 320 and the second source electrode 930 is electrically connected with the data line 330. The second channel layer 920 is disposed at a certain distance away from the intersection of the scan line 320 and the data line 330 and is sandwiched between the scan lines 320, the second source electrode 930 and the second drain electrode 940. The second drain electrode 940 extends from the upside of the scan line 320 toward one side of the scan line 320 to the downside of the pixel electrode 344.

Referring to FIGS. 9A to 9D again, when the first TFT T1 is damaged, at least one of the connection 350 between the first TFT T1 and the scan line 320, the connection 360 between the first TFT T1 and the data line 330, and the connection 370 between the first TFT T1 and the pixel electrode 344 is cut by laser cutting process. Then a laser welding method is employed for electrically connecting the second TFT T2 with the pixel electrode 344 by welding the second drain electrode 940 together with the pixel electrode 344 via laser. Another method for electrically connecting the second TFT T2 with the pixel electrode 344 burning off the passivation layer above the second drain electrode 940 via laser and then forming a thin metal layer by a laser CVD process.

The Eighth Embodiment

Figure 10A:
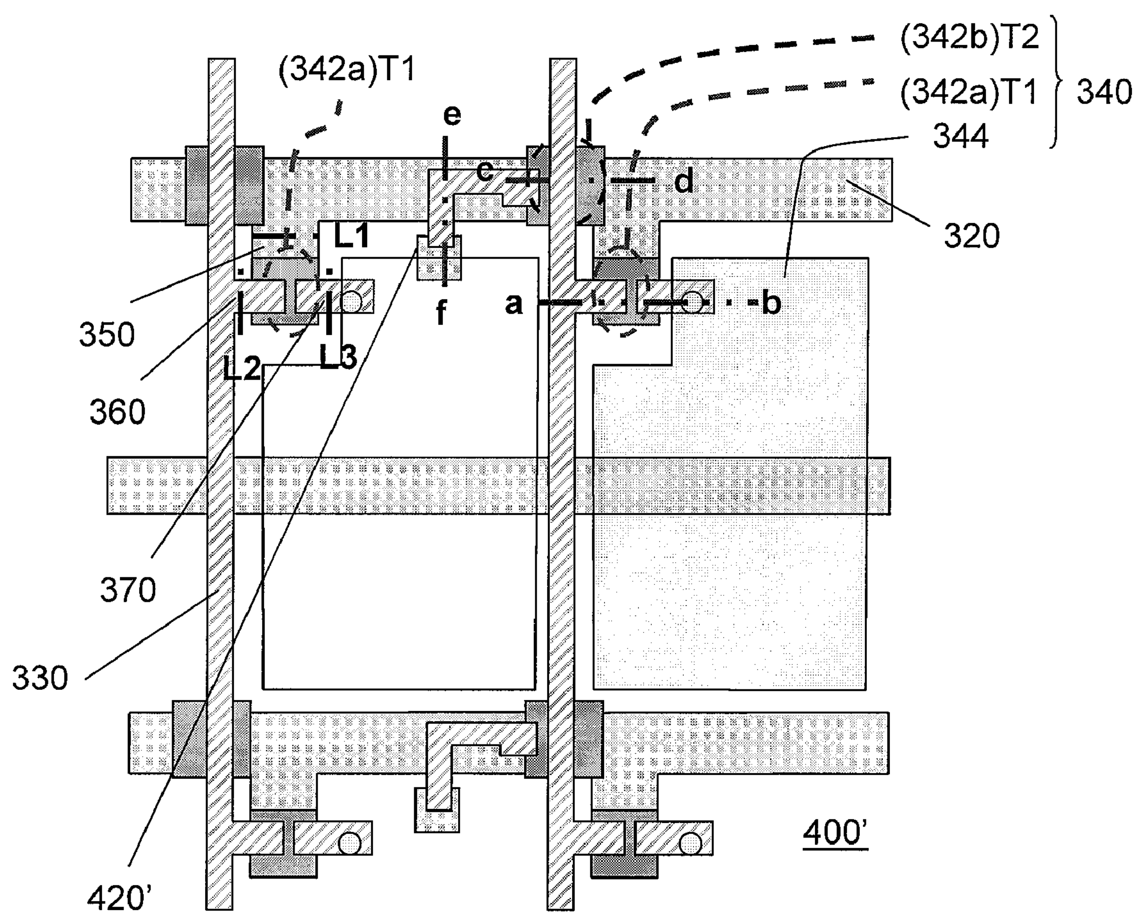
FIG. 10A is a top view of an active matrix substrate according to the eighth embodiment of the present invention.
Figure 10B:
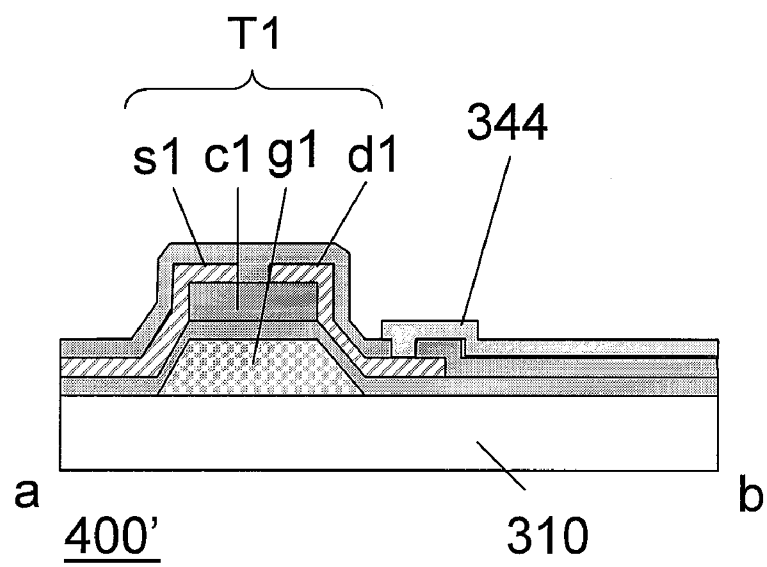
FIGS. 10B, 10C and 10D are cross-sectional views of FIG. 10A, respectively, along with line a-b, line c-d and line e-f.
Figure 10C:
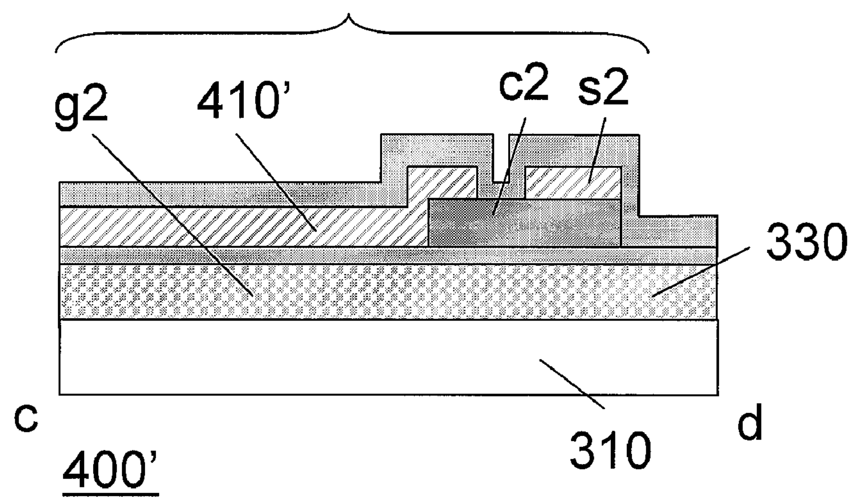
Figure 10D:
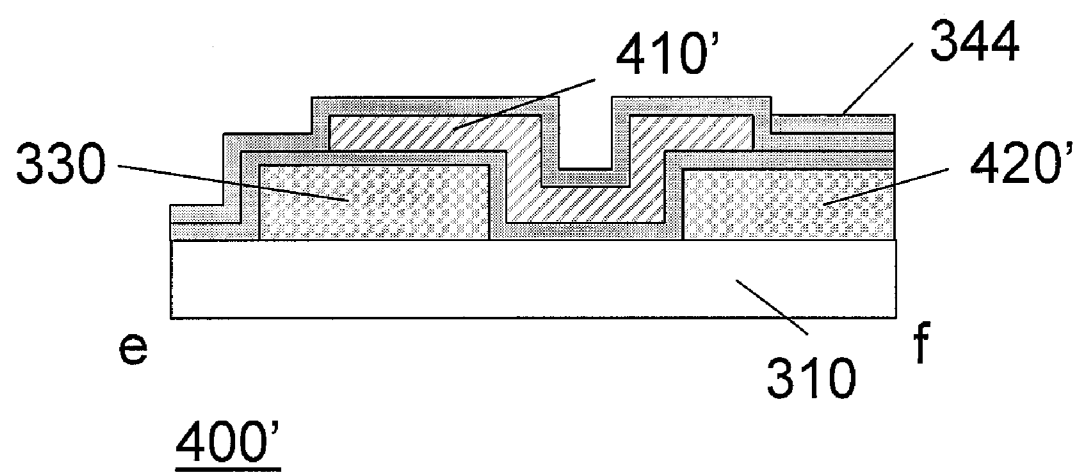

FIG. 10A is a top view of an active matrix substrate according to the eighth embodiment of the invention, which is a modification from FIG. 3A. FIGS. 10B, 10C and 10D are cross-sectional views of FIG. 10A respectively along with line a-b, line c-d and line e-f. Referring to FIGS. 10A to 10D together, the active matrix substrate 400' of the present embodiment is similar to the active matrix substrate 400 of the second embodiment. The main difference is that the active matrix substrate 400' includes a repair line 420' disposed under the second drain electrode 410 and the pixel electrode 344. The repair line 420 belongs to the first metal layer and is electrically isolated from the second drain electrode 410 by a dielectric layer (gate insulating layer).

Referring to FIGS. 10A to 10D, when the first TFT T1 of the adjacent pixel unit 340 (the first TFT T1 at the left side in FIG. 10A) is damaged, a laser cutting process is employed to cut at least one of the connection 350 between the first TFT T1 and the scan line 320, the connection 360 between the first TFT T1 and the data line 330, and the connection 370 between the first TFT T1 and the pixel electrode 344. Then, a laser is employed for burning the overlapped area of the repair line 420', the second drain electrode 410' and the pixel electrode 344 for welding the second drain electrode 410', the pixel electrode 344 and the repair line 420'. Thus, the second TFT T2 is electrically connected with the pixel electrode 344 at the left side of FIG. 10A. Accordingly, the pixel unit 340 is repaired.

In summary, the active matrix substrate and the pixel unit repair method thereof have at least the following advantages:

1. Comparing with a conventional TFT array substrate of which a pixel unit has only one TFT, the active matrix substrate provided by the invention has redundant active devices. When an active device electrically connected with a pixel electrode is damaged, other active devices (redundant active device) may be employed for substituting the original active device so that the pixel unit can resume operating normally. As a result, the problem of bright dot defects on the LCD panel may be avoided and the repair ratio of the LCD panel is according increased;

2. Comparing with another conventional TFT array substrate of which repaired pixel units only display full darkness or brightness, the pixel units of the active matrix substrate according to the invention will resume normal functions after repaired; and 3. The manufacturing of the active matrix substrate and the pixel unit repair method thereof according to the invention are compatible with those conventional processes. Though the patterns of two light shelters are needed for modifications, no extra production equipments are required.

It should be noted that specific embodiments of, and examples for, the invention are described herein for illustrative purposes, various equivalent modifications are possible within the scope of the invention, as those skilled in the relevant art will recognize that modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. An active matrix substrate, comprising:

a substrate;

a plurality of scan lines disposed on the substrate;

a plurality of data lines disposed on the substrate; and a plurality of pixel units, each of the pixel units being electrically connected with the one of the scan lines and one of the data lines, at least a part of the pixel units further comprising:

a first active device electrically connected with the pixel electrode;

a second active device electrically isolated from the pixel electrode, wherein the second active device is a second TFT disposed over the scan line, and the second TFT comprises:

a second gate electrode electrically connected with the scan line;

a second channel layer, wherein the second channel layer is disposed at the intersection of the scan line and the data line, and the second channel layer is sandwiched between the scan line and the data line;

a second source electrode electrically connected with the data line;

a second drain electrode electrically isolated from the pixel electrode; and a pixel electrode electrically connected with one of the active devices, wherein the second drain electrode extends from the upside of the scan line to the downside of the pixel electrode along both sides of the scan line.

2. The active matrix substrate according to claim 1, wherein the first active device is a first TFT comprising:

a first gate electrode electrically connected with the scan line;

a first channel layer;

a first source electrode electrically connected with the data line; and a first drain electrode electrically connected with the pixel electrode.

3. A method for repairing a pixel unit of an active matrix substrate according to claim 1, the repair method comprising:

cutting the connection of the first active device with the scan line and the data line so as to isolate the first active device from the scan line and the data line; and electrically connecting the second active device to the pixel electrode.

4. The method according to claim 3, wherein cutting the connection of the first active device with the scan line and the data line comprises laser cutting process.

5. The method according to claim 3, wherein electrically connecting the second active device to the pixel electrode comprises laser welding process or laser chemical vapor deposition process.

6. An active matrix substrate, comprising:

a substrate;

a plurality of scan lines disposed on the substrate;

a plurality of data lines disposed on the substrate; and a plurality of pixel units, each of the pixel units being electrically connected with the one of the scan lines and one of the data lines, at least a part of the pixel units further comprising:

a first active device electrically connected with the pixel electrode;

a second active device electrically isolated from the pixel electrode, wherein the second active device is a second TFT disposed over the scan line, and the second TFT comprises:

a second gate electrode electrically connected with the scan line;

a second channel layer;

a second source electrode electrically connected with the data line;

a second drain electrode electrically isolated from the pixel electrode, the second drain electrode extends from the upside of the scan line to the downside of the pixel electrode along both side of the scan line; and a pixel electrode electrically connected with one of the active devices.

7. The active matrix substrate according to claim 6, wherein the first active device is a first TFT comprising:

a first gate electrode electrically connected with the scan line;

a first channel layer;

a first source electrode electrically connected with the data line; and a first drain electrode electrically connected with the pixel electrode.

* * * * *